(12) United States Patent
Kemp et al.

(10) Patent No.: US 12,377,366 B2
(45) Date of Patent: Aug. 5, 2025

(54) DEVICES AND SYSTEMS FOR TREATING WATER AND OTHER FLUIDS

(71) Applicant: Undesert Corporation, Los Alamos, NM (US)

(72) Inventors: Hillery Thomas Kemp, Alamogordo, NM (US); John S. Manford, Cloudcroft, NM (US)

(73) Assignee: Undesert Corporation, Los Alamos, NM (US)

( * ) Notice: Subject to any disclaimer, the term of this patent is extended or adjusted under 35 U.S.C. 154(b) by 0 days.

(21) Appl. No.: 18/650,359

(22) Filed: Apr. 30, 2024

(65) Prior Publication Data

US 2024/0382866 A1 Nov. 21, 2024

Related U.S. Application Data

(60) Provisional application No. 63/577,745, filed on May 16, 2023.

(51) Int. Cl.
*C02F 1/14* (2023.01)
*B01D 1/00* (2006.01)
(Continued)

(52) U.S. Cl.
CPC ............ *B01D 3/38* (2013.01); *B01D 1/0035* (2013.01); *B01D 1/0058* (2013.01); *B01D 1/22* (2013.01);
(Continued)

(58) Field of Classification Search
CPC ............ C02F 1/04–20; E21B 43/2406; E21B 43/2408; E21B 21/06; E21B 21/063; E21B 21/067
See application file for complete search history.

(56) References Cited

U.S. PATENT DOCUMENTS 3,104,210 A * 9/1963 Mount ............... C02F 1/14
202/234
3,754,376 A * 8/1973 Kent ............... B01D 19/0005
95/264
(Continued)

FOREIGN PATENT DOCUMENTS

KR 20180015430 A 2/2018

OTHER PUBLICATIONS

Theodor C. Sauer, "Volatile organic compounds in open ocean and coastal surface waters", Organic Geochemistry, vol. 3, Issue 3, 1981, pp. 91-101, ISSN 0146-6380, https://doi.org/10.1016/0146-6380(81)90003-6.*

(Continued)

*Primary Examiner* — Jonathan Luke Pilcher
(74) *Attorney, Agent, or Firm* — Woodard, Emhardt, Henry, Reeves & Wagner LLP

(57) ABSTRACT

A system and devices for treating and purifying fluids such as water. The system includes multiple devices and moves water through the devices. The system may include a steam boiler. The steam boiler may be connected to a steam stripper. Fluids may flow through the steam boiler and fed into the bottom of the steam stripper. The system may have salt treatment modules and carbon compound modules. The system may include desalination modules. The system may provide outputs of purified water, salt, and/or concentrated salt brine.

12 Claims, 16 Drawing Sheets

(51) Int. Cl.
  *B01D 1/22*   (2006.01)
  *B01D 3/38*   (2006.01)
  *B01D 5/00*   (2006.01)
  *C02F 1/04*   (2023.01)
  *C02F 1/08*   (2023.01)
  *C02F 1/16*   (2023.01)
  *C02F 1/20*   (2023.01)
  *C02F 101/32*  (2006.01)

(52) U.S. Cl.
  CPC ............ *B01D 5/0069* (2013.01); *C02F 1/048* (2013.01); *C02F 1/08* (2013.01); *C02F 1/14* (2013.01); *C02F 1/16* (2013.01); *C02F 1/20* (2013.01); *C02F 2101/322* (2013.01); *C02F 2303/10* (2013.01)

(56) References Cited

U.S. PATENT DOCUMENTS

| | | | | |
|---|---|---|---|---|
| 4,329,205 | A * | 5/1982 | Tsumura | C02F 1/14 203/DIG. 1 |
| 4,486,299 | A * | 12/1984 | Kettinger | B01D 3/38 208/356 |
| 4,713,089 | A * | 12/1987 | Robbins | C02F 1/20 202/205 |
| 5,158,650 | A | 10/1992 | Wilkerson | |
| 5,651,833 | A * | 7/1997 | Bremer | B09C 1/06 423/245.3 |
| 6,027,607 | A * | 2/2000 | Corniel | C02F 1/04 159/901 |
| 8,088,257 | B2 | 1/2012 | Kemp | |
| 8,341,961 | B2 * | 1/2013 | Glynn | C02F 1/14 60/641.11 |
| 8,580,085 | B2 | 11/2013 | Kemp | |
| 8,603,301 | B2 * | 12/2013 | Heins | B01D 5/006 203/40 |
| 9,238,978 | B2 * | 1/2016 | Levin | F01K 3/188 |
| 9,527,005 | B2 * | 12/2016 | Dighe | C02F 1/20 |
| 9,527,006 | B2 | 12/2016 | Burton et al. | |
| 2010/0282592 | A1 * | 11/2010 | Elgat | C02F 1/66 203/10 |
| 2013/0062191 | A1 * | 3/2013 | Dighe | B01D 1/16 202/180 |
| 2022/0410029 | A1 * | 12/2022 | Chen | B01D 61/3641 |
| 2023/0014345 | A1 | 1/2023 | Katz | |

OTHER PUBLICATIONS

PCT, Int. App. No. PCT/US2024/027998 International Search Report (ISR), 3 pages, Aug. 27, 2024.
PCT, Int. App. No. PCT/US2024/027998 Written Opinion, 10 pages, Aug. 27, 2024.

* cited by examiner

DEVICES AND SYSTEMS FOR TREATING WATER AND OTHER FLUIDS

CROSS REFERENCE TO RELATED APPLICATIONS

This application claims the benefit of U.S. Patent Application No. 63/577,745, filed May 16, 2023, which is hereby incorporated by reference.

BACKGROUND

With ever increasing populations, finding potable water sources has become a more significant concern. While desalination systems have been used to create drinkable water from saltwater, such desalination systems are quite expensive, consume significant amounts of energy, and are sometimes environmentally unfriendly. Moreover, most forms of unpotable water contain multiple different types of contaminants that are not simply removed through a desalination process.

Thus, there is a need for improvement in this field.

SUMMARY

As noted before, obtaining potable water for humans is a significant concern. Common systems typically require significant amounts of energy in order to remove contaminants from the water so as to make the water even close to drinkable. Most contaminated water contains multiple different contaminant sources. For example, polluted seawater may not only contain mineral contaminants, like salt, but the seawater may also contain hazardous carbon compounds like oil or other hazardous hydrocarbons. This situation is common in oil rich middle eastern countries where seawater and oil may be plentiful, but drinkable water is scarce. Once more, desalination systems normally require significant amounts of energy, and these desalination systems most of the time are limited in the types of contaminants that can be removed. Fossil fuels are used to commonly power these desalination systems. The use of fossil fuels can be environmentally unfriendly and can be a further source of contamination.

A unique water decontamination system has been developed to address these as well as other issues. The water decontamination system includes a solar desalination module that removes salt or other minerals from the water. In one version, the desalination module includes an enhanced surface evaporator that produces purified water and brine. Another version of the desalination module includes a solar still that is designed to separate or distill purified water from brackish saltwater and/or otherwise contaminated water using a solar energy distillation process. Evaporation or distillation via the enhanced surface evaporator and the solar still are quite environmentally friendly processes. However, during the development of this system, it was found that the yields of purified water can be less than ideal in these systems. Most water sources, like oceans, lakes, and industrial water containers, are relatively quite cold such that most are near or even significantly below ambient temperatures. Significant amounts of heat energy still need to be applied to the water from these water sources in order to promote high water evaporation levels which in turn increases purified water yields.

During development of this system, it was discovered that waste heat or heat from other energy sources outside of the desalination module can be used to preheat the water supplied to the enhanced surface evaporator and/or the solar still so that the water would be readily evaporated. In one variation, the waste heat or heat from other energy sources outside of the decontamination system and/or internal to the decontamination system raises the temperature of the contaminated water well above the ambient temperature in order to increase yield of purified water from the solar still and/or the enhanced evaporator surface. In one particular example, this waste thermal energy raises the water temperature by at least 15 degrees Celsius (15° C.) above the ambient temperature. In one variation, the energy source provides at least 50 watts to heat the water, and in another variation, the energy source provides at least 500 watts to heat the water.

External sources of this waste heat can come from a wide variety of sources, such as from engine exhaust, boiler water blowdown, vented low pressure steam, furnace flue gas, geothermal heat, and/or refinery heat, to name just a few examples. Other waste heat sources can come from internal sources within the water decontamination system but outside of the desalination module. In one version, the water decontamination system includes a volatiles removal module that is configured to remove volatile contaminants, like volatile organic compounds (VOCs), fuel, or other compounds, from the waste water. Excess or waste heat from the volatiles removal module is used to preheat the contaminated water before entering the system or while in the system.

In one variation, the volatiles removal module includes a steam stripper that removes at least some of the contaminants that are volatile via a steam stripping process and a boiler that provides steam to the steam stripper. Heat from the boiler and/or the steam stripper is used to heat the contaminated water that is supplied to the desalination module. In some cases, the volatile contaminants, such as fuel and/or VOCs, that are stripped from the waste water in the steam stripper are combusted within the boiler to provide additional heat to the process.

As noted before, the enhanced surface evaporator in the desalination module is configured to produce purified water and brine. To further promote evaporation, the enhanced surface evaporator in one example has a surface media that enhances evaporation of the water by creating a greater exposed surface area. In other words, the surface media has high surface packing to promote water evaporation. In some cases, the surface media is made from environmentally friendly material like wood fiber and/or cloth fiber. In one form, the desalination module includes one or more pans that are used to dry the brine to form solid salt. In such a configuration, the waste or external heat can be applied to the pans to further promote drying of the salt.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a contaminated water feed source configured to supply contaminated feed water.

Aspect 3 generally concerns the system of any previous aspect in which the contaminated feed water contains one or more contaminants.

Aspect 4 generally concerns the system of any previous aspect in which the contaminants include volatile compounds.

Aspect 5 generally concerns the system of any previous aspect in which the contaminants include carbon containing compounds.

Aspect 6 generally concerns the system of any previous aspect in which the contaminants include volatile organic compounds (VOCs).

Aspect 7 generally concerns the system of any previous aspect in which the contaminants include fuel.

Aspect 8 generally concerns the system of any previous aspect in which the contaminants include minerals.

Aspect 9 generally concerns the system of any previous aspect in which the contaminants include salt.

Aspect 10 generally concerns the system of any previous aspect in which the contaminated feed water from the contaminated water feed source is in a liquid phase.

Aspect 11 generally concerns the system of any previous aspect in which the volatiles removal module configured to remove at least some of the contaminants from the contaminated feed water.

Aspect 12 generally concerns the system of any previous aspect in which the volatiles removal module includes a steam stripper.

Aspect 13 generally concerns the system of any previous aspect in which the steam stripper is configured to receive the contaminated feed water from the contaminated water feed source.

Aspect 14 generally concerns the system of any previous aspect in which the steam stripper is fluidly coupled to the contaminated water feed source to receive the contaminated feed water.

Aspect 15 generally concerns the system of any previous aspect in which the steam stripper is configured to remove at least some of the contaminants from the contaminated feed water.

Aspect 16 generally concerns the system of any previous aspect in which the contaminants removed by the steam stripper include the carbon containing compounds.

Aspect 17 generally concerns the system of any previous aspect in which the contaminants removed by the steam stripper include the volatile organic compounds (VOCs).

Aspect 18 generally concerns the system of any previous aspect in which the contaminants removed by the steam stripper include the fuel.

Aspect 19 generally concerns the system of any previous aspect in which the steam stripper is a tray tower steam stripper.

Aspect 20 generally concerns the system of any previous aspect in which the tray tower steam stripper includes one or more trays stacked in a column.

Aspect 21 generally concerns the system of any previous aspect in which the steam stripper is a packed column steam stripper.

Aspect 22 generally concerns the system of any previous aspect in which the steam stripper is a spray steam stripper.

Aspect 23 generally concerns the system of any previous aspect in which the steam stripper is a bubble column steam stripper.

Aspect 24 generally concerns the system of any previous aspect in which the steam stripper is a centrifugal contactor steam stripper.

Aspect 25 generally concerns the system of any previous aspect in which the steam stripper has a countercurrent flow.

Aspect 26 generally concerns the system of any previous aspect in which the steam stripper has a co-current flow.

Aspect 27 generally concerns the system of any previous aspect in which the steam stripper has a liquid inlet.

Aspect 28 generally concerns the system of any previous aspect in which the liquid inlet is fluidly coupled to the contaminated feed water source to receive the contaminated feed water.

Aspect 29 generally concerns the system of any previous aspect in which the steam stripper has a liquid outlet.

Aspect 30 generally concerns the system of any previous aspect in which the contaminated feed water flows from the liquid inlet to the liquid outlet in the steam stripper.

Aspect 31 generally concerns the system of any previous aspect in which the steam stripper is a columnar shaped steam stripper.

Aspect 32 generally concerns the system of any previous aspect in which the contaminated feed water flows in a vertical direction from the liquid inlet to the liquid outlet in the steam stripper.

Aspect 33 generally concerns the system of any previous aspect in which the contaminated feed water flows in a downwards direction from the liquid inlet to the liquid outlet in the steam stripper.

Aspect 34 generally concerns the system of any previous aspect in which the contaminated feed water flows in a horizontal direction from the liquid inlet to the liquid outlet in the steam stripper.

Aspect 35 generally concerns the system of any previous aspect in which the liquid inlet and the liquid outlet are located on opposing ends of the steam stripper.

Aspect 36 generally concerns the system of any previous aspect in which the steam stripper is configured to remove at least some of the contaminants from the contaminated feed water from the contaminated water feed source to create stripped water.

Aspect 37 generally concerns the system of any previous aspect in which the stripped water is in a liquid phase.

Aspect 38 generally concerns the system of any previous aspect in which the stripped water has at least some of the contaminants removed.

Aspect 39 generally concerns the system of any previous aspect in which the liquid outlet is configured to discharge the stripped water.

Aspect 40 generally concerns the system of any previous aspect including a heat exchanger configured to exchange heat from the stripped water to the contaminated feed water from the contaminated water feed source.

Aspect 41 generally concerns the system of any previous aspect in which the heat exchanger is fluidly coupled along a contaminated water flow path between the contaminated water feed source and the liquid inlet of the steam stripper.

Aspect 42 generally concerns the system of any previous aspect in which the heat exchanger is fluidly coupled to the liquid outlet to receive the stripped water from the steam stripper.

Aspect 43 generally concerns the system of any previous aspect in which the steam stripper is configured to use steam to strip at least some of the contaminants from the contaminated feed water.

Aspect 44 generally concerns the system of any previous aspect in which the steam and the contaminated feed water flow in opposite directions within the steam stripper.

Aspect 45 generally concerns the system of any previous aspect in which the steam and the contaminated feed water flow in the same direction within the steam stripper.

Aspect 46 generally concerns the system of any previous aspect in which the steam stripper has a steam inlet through which the steam is supplied to the steam stripper.

Aspect 47 generally concerns the system of any previous aspect in which the steam stripper has a steam outlet from where the steam is discharged from the steam stripper.

Aspect 48 generally concerns the system of any previous aspect in which the steam flows from the steam inlet to the steam outlet in the steam stripper.

Aspect 49 generally concerns the system of any previous aspect in which the steam flows in a vertical direction from the steam inlet to the steam outlet in the steam stripper.

Aspect 50 generally concerns the system of any previous aspect in which the steam flows in a horizontal direction from the steam inlet to the steam outlet in the steam stripper.

Aspect 51 generally concerns the system of any previous aspect in which the steam inlet and the steam outlet are located on opposing ends of the steam stripper.

Aspect 52 generally concerns the system of any previous aspect in which the volatiles removal module includes a steam boiler.

Aspect 53 generally concerns the system of any previous aspect in which the steam boiler is configured to supply the steam to the steam stripper.

Aspect 54 generally concerns the system of any previous aspect including a flash tank fluidly coupled between the steam boiler and the steam stripper.

Aspect 55 generally concerns the system of any previous aspect in which the flash tank is fluidly coupled to the steam inlet of the steam stripper.

Aspect 56 generally concerns the system of any previous aspect in which the flash tank is configured to regulate the pressure of the steam.

Aspect 57 generally concerns the system of any previous aspect in which the flash tank is configured to regulate the temperature of the steam.

Aspect 58 generally concerns the system of any previous aspect including a condenser configured to condense the steam from the steam stripper to form a steam stripper distillate.

Aspect 59 generally concerns the system of any previous aspect in which the condenser is fluidly coupled to the steam outlet of the steam stripper.

Aspect 60 generally concerns the system of any previous aspect including an accumulator tank configured to collect the steam stripper distillate from the condenser.

Aspect 61 generally concerns the system of any previous aspect in which the accumulator tank includes a drum.

Aspect 62 generally concerns the system of any previous aspect in which the steam stripper distillate includes liquid water.

Aspect 63 generally concerns the system of any previous aspect in which the steam stripper distillate includes at least some of the contaminants from the contaminated feed water.

Aspect 64 generally concerns the system of any previous aspect in which the steam stripper distillate includes the carbon containing compounds.

Aspect 65 generally concerns the system of any previous aspect in which the steam stripper distillate includes the volatile organic compounds (VOCs).

Aspect 66 generally concerns the system of any previous aspect in which the steam stripper distillate includes the fuel.

Aspect 67 generally concerns the system of any previous aspect in which the steam stripper includes a liquid recycler inlet.

Aspect 68 generally concerns the system of any previous aspect in which the liquid recycler inlet is configured to receive the liquid water from the condenser.

Aspect 69 generally concerns the system of any previous aspect in which the liquid recycler inlet is configured to receive the liquid water from the accumulator tank.

Aspect 70 generally concerns the system of any previous aspect in which the liquid recycler inlet is fluidly coupled to the accumulator tank.

Aspect 71 generally concerns the system of any previous aspect in which the steam stripper is configured to strip the contaminants in the liquid water from the condenser.

Aspect 72 generally concerns the system of any previous aspect in which the steam stripper is configured to strip the contaminants in the liquid water from the accumulator tank.

Aspect 73 generally concerns the system of any previous aspect in which the steam boiler has a boiler heat exchanger.

Aspect 74 generally concerns the system of any previous aspect in which the steam boiler has a burner.

Aspect 75 generally concerns the system of any previous aspect in which the steam boiler has a combustion chamber.

Aspect 76 generally concerns the system of any previous aspect in which the accumulator tank is fluidly coupled to the burner of the steam boiler.

Aspect 77 generally concerns the system of any previous aspect in which the burner is configured to burn at least some of the contaminants from the steam stripper.

Aspect 78 generally concerns the system of any previous aspect in which the steam boiler is configured to burn the carbon containing compounds from the steam stripper distillate.

Aspect 79 generally concerns the system of any previous aspect in which the steam boiler is configured to burn the volatile organic compounds (VOCs) in the steam stripper distillate.

Aspect 80 generally concerns the system of any previous aspect in which the steam boiler is configured to burn the fuel in the steam from the steam stripper.

Aspect 81 generally concerns the system of any previous aspect in which the boiler heat exchanger is fluidly coupled to the accumulator tank to receive the liquid water from the accumulator tank.

Aspect 82 generally concerns the system of any previous aspect in which the steam boiler is fluidly coupled to the condenser to receive the liquid water from the condenser.

Aspect 83 generally concerns the system of any previous aspect in which the steam boiler is configured to convert the liquid water from the condenser to the steam.

Aspect 84 generally concerns the system of any previous aspect in which the steam boiler is configured to convert the liquid water from the accumulator tank to the steam.

Aspect 85 generally concerns the system of any previous aspect including a desalination module configured to remove at least some of the contaminants from the stripped water.

Aspect 86 generally concerns the system of any previous aspect in which the desalination module is configured to remove the minerals from the stripped water.

Aspect 87 generally concerns the system of any previous aspect in which the desalination module is configured to remove the salt from the stripped water.

Aspect 88 generally concerns the system of any previous aspect in which the desalination module is fluidly coupled to the steam stripper.

Aspect 89 generally concerns the system of any previous aspect in which the desalination module is fluidly coupled to the liquid outlet of the steam stripper.

Aspect 90 generally concerns the system of any previous aspect in which the desalination module is fluidly coupled to the heat exchanger.

Aspect 91 generally concerns the system of any previous aspect in which the desalination module includes a solar still.

Aspect 92 generally concerns the system of any previous aspect in which the solar still is configured to produce purified water from the stripped water.

Aspect 93 generally concerns the system of any previous aspect in which the solar still is configured to produce brine from the stripped water.

Aspect 94 generally concerns the system of any previous aspect including one or more drying pans configured to receive the brine from the solar still.

Aspect 95 generally concerns the system of any previous aspect in which the drying pans are configured to produce dry salt from the brine.

Aspect 96 generally concerns the system of any previous aspect in which the desalination module includes an enhanced surface evaporator.

Aspect 97 generally concerns the system of any previous aspect in which the enhanced surface evaporator is configured to produce purified water from the stripped water.

Aspect 98 generally concerns the system of any previous aspect in which the enhanced surface evaporator is configured to produce brine from the stripped water.

Aspect 99 generally concerns the system of any previous aspect in which the enhanced surface evaporator has surface media configured to promote evaporation.

Aspect 100 generally concerns the system of any previous aspect in which the surface media is configured to enhance surface evaporation at or below the boiling point of the contaminated feed water.

Aspect 101 generally concerns the system of any previous aspect in which the surface media includes wood fiber.

Aspect 102 generally concerns the system of any previous aspect in which the surface media includes cloth fiber.

Aspect 103 generally concerns the system of any previous aspect in which the surface media includes high surface packing.

Aspect 104 generally concerns the system of any previous aspect including an energy source configured to heat the contaminated feed water.

Aspect 105 generally concerns the system of any previous aspect in which the energy source is configured to promote evaporation at the desalination module.

Aspect 106 generally concerns the system of any previous aspect in which the energy source is configured to promote evaporation at the solar still.

Aspect 107 generally concerns the system of any previous aspect in which the energy source is configured to promote evaporation at the enhanced surface evaporator.

Aspect 108 generally concerns the system of any previous aspect in which the energy source is configured to heat the drying pans.

Aspect 109 generally concerns the system of any previous aspect in which the energy source is configured to promote drying of the salt in the drying pans.

Aspect 110 generally concerns the system of any previous aspect in which the energy source is configured to heat the contaminated feed water to at least 15 degrees Celsius above ambient temperature.

Aspect 111 generally concerns the system of any previous aspect in which the energy source is configured to provide at least 50 watts.

Aspect 112 generally concerns the system of any previous aspect in which the energy source is configured to provide at least 250 watts.

Aspect 113 generally concerns the system of any previous aspect in which the energy source is configured to provide at least 400 watts.

Aspect 114 generally concerns the system of any previous aspect in which the energy source is configured to provide at least 500 watts.

Aspect 115 generally concerns the system of any previous aspect in which the energy source includes an external energy source.

Aspect 116 generally concerns the system of any previous aspect in which the external energy source includes engine exhaust.

Aspect 117 generally concerns the system of any previous aspect in which the external energy source includes waste heat from one or more thermal devices.

Aspect 118 generally concerns the system of any previous aspect in which the external energy source includes a geothermal heat source.

Aspect 119 generally concerns the system of any previous aspect in which the energy source includes an internal energy source.

Aspect 120 generally concerns the system of any previous aspect in which the internal energy source includes heat from the volatiles removal module.

Aspect 121 generally concerns the system of any previous aspect in which the energy source includes heat from the steam boiler.

Aspect 122 generally concerns the system of any previous aspect in which the energy source includes heat from the steam stripper.

Aspect 123 generally concerns the system of any previous aspect in which the energy source excludes solar energy.

Aspect 124 generally concerns the system of any previous aspect in which the desalination module is configured to remove at least some of the contaminants from the contaminated feed water.

Aspect 125 generally concerns the system of any previous aspect in which the desalination module is configured to produce purified water from the contaminated feed water.

Aspect 126 generally concerns the system of any previous aspect in which the desalination module is configured to produce brine from the contaminated feed water.

Aspect 127 generally concerns the system of any previous aspect in which the solar still is configured to produce brine.

Aspect 128 generally concerns the system of any previous aspect including a bubbler configured to create bubbles in the contaminated feed water.

Aspect 129 generally concerns the system of any previous aspect in which the bubbler is fluidly coupled to the enhanced surface evaporator to supply the contaminated water with the bubbles to the enhanced surface evaporator.

Aspect 130 generally concerns the system of any previous aspect in which the bubbles enhance evaporation in the enhanced surface evaporator.

Aspect 131 generally concerns the system of any previous aspect in which the bubbler is a nano-bubbler configured to create nano-sized bubbles.

Aspect 132 generally concerns a method.

Aspect 133 generally concerns the method of any previous aspect including supplying contaminated feed water from a contaminated water feed source.

Aspect 134 generally concerns the method of any previous aspect including removing at least some of the contaminants from the contaminated feed water with a volatiles removal module.

Aspect 135 generally concerns the method of any previous aspect including stripping volatile contaminants from the contaminated feed water with a steam stripper to create stripped water.

Aspect 136 generally concerns the method of any previous aspect including removing at least some of the contaminants from the contaminated feed water with a desalination module.

Aspect 137 generally concerns the method of any previous aspect including desalinating the stripped water with a desalination module.

Aspect 138 generally concerns the method of any previous aspect including supplying energy from an energy source to the desalination module to promote evaporation.

Aspect 139 generally concerns the method of any previous aspect including raising temperature of the contaminated feed water by at least 15 degrees Celsius with the energy source.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
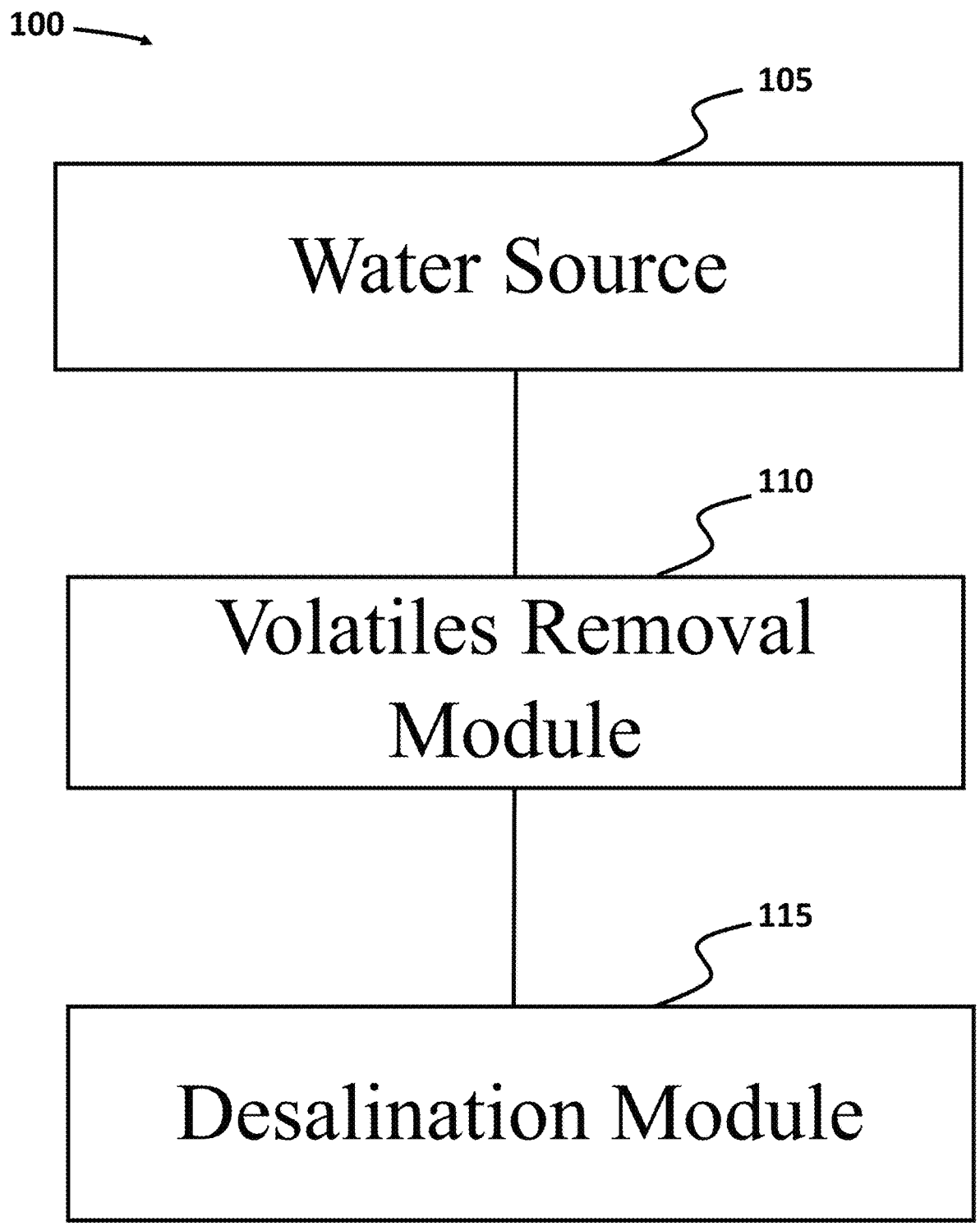
FIG. 1 is a block diagram of a water treatment system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

FIG. 1 shows a diagram of a water decontamination system 100 that is configured to decontaminate contaminated water from a feed water source 105. In the illustrated example, the system includes a volatiles removal module 110 and a desalination module 115. The volatiles removal module 110 is configured to remove volatile contaminants, like volatile hydrocarbons or other organic compounds, from the contaminated water. The desalination module 115 is configured to remove mineral contaminants, such as salt, from the water. The system 100 in the depicted example includes both the volatiles removal module 110 and the desalination module 115 which work in tandem in order to treat contaminated water from the water source 105. In other examples, the system 100 does not include the volatiles removal module 110 such that the water from the water source 105 is fed directly to the volatiles removal module 110 (and not the desalination module 115). In still other examples, the system 100 includes the volatiles removal module 110 but not the desalination module 115. The system 100 can include other types of water treatment equipment such as filters and settling ponds. The system 100 will be described as treating water to create potable water or drinking water but it should be appreciated that certain aspects of this system 100 can be used to treat other fluids.

In some aspects of the system 100, the water source 105 of the system 100 separates certain substances within the water source 105 via the volatiles removal module 110 and/or the desalination module 115. In some examples, the volatiles removal module 110 is used to create a gradient within the water source 105, such as a concentration gradient, by physically separating certain substances within the water source 105 from the remainder of the other fluids within the system 100. The desalination module 115 is designed to remove salt in particular from the water source 105. Often times, the system 100 will utilize the differences in physical properties of the molecules within the water source 105 that is being treated. For example, certain aspects of the system 100 use differences in boiling points, volatility, size, or other differences amongst the contaminants and water in order to aid the efficiency of the system 100. In some instances, the end-goal of the system 100 is ultimately to remove certain contaminants from the water source 105 including by first separating the fluids via the desalination module 115 before removing unwanted or harmful particles from the water source 105.

As will be understood, the system 100 will often integrate features of the volatiles removal module 110 and the desalination module 115 with one another. Energy from the volatiles removal module 110 is recycled to the desalination module 115 and vice versa. End products of the desalination module 115 are collected or recycled for use by devices within the volatiles removal module 110. The system 100 uses temperature differences in the different phases of the system 100 in order to aid in energy capture and increase the efficiency of the system. For instance, some portions of the system 100 require the water source 105 to be relatively cooler or warmer than other areas. The system 100 uses the relative temperatures to transfer heat energy, as needed, to heat up or cool down water within the system 100.

In some examples, the system 100 directs sequential manipulation of the contaminated feed water from the water source 105 as the water flows from one portion of the system 100 to the next. In other embodiments, the water from the water source 105 is circulated in a nonsequential fashion through portions of the system 100. Additionally, the system 100 includes integrated modules amongst one or more device(s) which are interactively combined in order to provide desirous effects to the water source 105 or other source of fluid.

Figure 2:
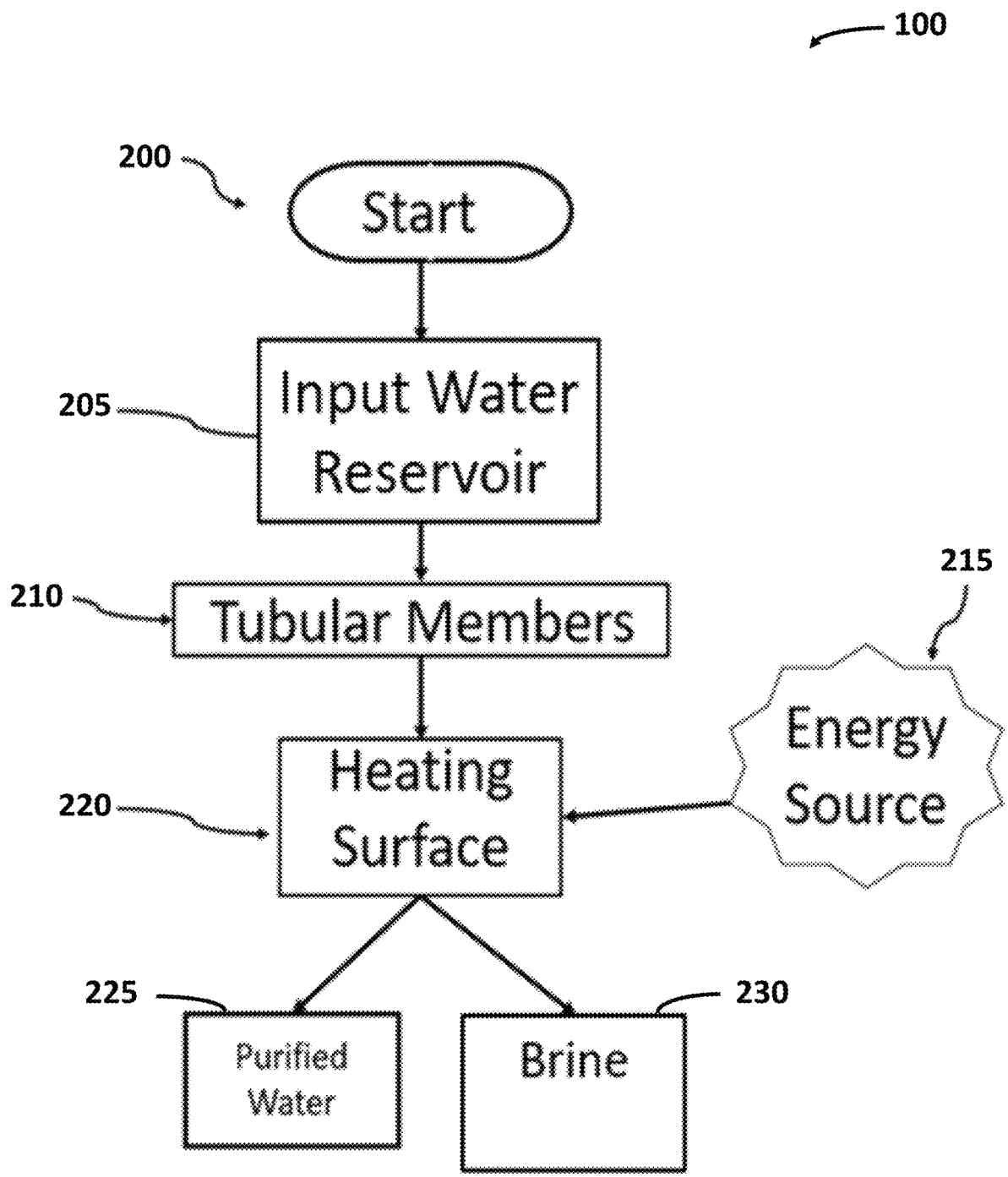
FIG. 2 is another block diagram of the system according to another example.

FIG. 2 shows a flow diagram the system 100 according to one embodiment. In the embodiment shown in FIG. 2, the system 100 begins with an initiation feed process 200. In other embodiments, the initiation feed process 200 is not necessary to implement the system 100. For example, in other embodiments, the water source 105 is a water body with an ongoing contaminant source such as algae in lakes or runoff contaminants from agricultural or industrial sources and the water source 105 is treated in a cyclical manner.

In the example iteration depicted in FIG. 2, the system 100 includes an input water reservoir 205. The input water reservoir 205 may act as the water source 105 so that the contaminated water is drawn off for use within the system 100. In this embodiment, the water or other liquid housed within the input water reservoir 205 is not being acted upon by the system 100 prior to the initiation feed process 200. The initiation feed process 200 in this example causes the contaminated water in the input water reservoir 205 to begin flowing into the system 100 including by causing the water in the input water reservoir 205 to begin flowing from a contaminated water source into certain devices of the system 100.

In the example system 100 depicted in FIG. 2, the system 100 includes one or more tubular members 210. The water in the water source 105 in some cases starts within the input water reservoir 205 and may then flow into the tubular members 210. In some embodiments, the process begins by the initiation feed process 200 causing the water source 105 to move out of the input water reservoir 205 into other devices within the system 100. In other embodiments, the system 100 is integrated such that the flow of the input water reservoir 205 is not unidirectional and certain aspects are integrated such that the water source 105 is circulated throughout the system 100 and re-enters or re-exits certain aspects of the system 100 such as the tubular members 210.

The system 100 utilizes an energy source 215 in order to effectuate aspects of the volatiles removal module 110 and the desalination module 115 of the system 100. The energy source 215 may be used to power the other devices within the system 100. The energy source 215 may be solar energy which is captured by the system 100 and used to provide power to the system 100.

For example, the system 100 in one form includes a heating surface 220. The energy source 215 may provide energy to the heating surface 220. The heating surface 220 may then convert and/or apply the enthalpic energy to the input water reservoir 205. The volatiles removal module 110 and/or the desalination module 115 may utilize a heating surface 220 to promulgate treatment or separation of certain molecules within system 100. The heating surface 220 includes causing evaporation of certain molecules of the water source 105. The system 100 may include one or more modules or devices used to separate pure water from salt-contaminated water. The system 100 may use different or multiple energy forms such as primary energy, renewable energy, geothermal energy, waste heat, and other forms of thermal energy in order to provide power to the system 100.

Aspects of the system 100 may provide different output products in different embodiments. For instance, the system 100 may provide one or more outputs including a purified water 225 and a brine 230. In certain aspects, the system 100 is linear and the purified water 225 is not recirculated in the system 100 but instead flows sequentially throughout the system 100 and is then collected. In other embodiments, the purified water 225 is recirculated to the input water reservoir 205 or is re-treated via the initiation feed process 200.

The system 100 may be directed toward a desalination module designed to remove salt from the water source 105. In such embodiments, the system 100 produces the purified water 225 and the brine 230 as end-products. In other embodiments, the products of the system 100 are different than the purified water 225 and the brine 230. In one embodiment, the system 100 uses the energy source 215 to power the device or devices associated with the system 100 or assist in powering the devices associated with the system 100, such as the input water reservoir 205, the tubular members 210, and the heating surface 220. In certain aspects, the energy source 215 produces waste heat. The waste heat from the energy source 215 can be re-directed to the system 100 to assist in powering the system 100. Additionally, incoming contaminated feed water such as from the water source 105 is processed via the input water reservoir 205, the tubular members 210, and the heating surface 220 and the output products may include the energy source 215 or salt depleted water. In other aspects, the output product of the system 100 may include the brine 230.

Other embodiments may use supplemental energy to power the system 100 or devices within the system 100 such as the input water reservoir 205, the tubular members 210, and the heating surface 220. The input water reservoir 205, the tubular members 210, and/or the energy source 215 further supplies the system 100 with heat energy. In some aspects, heat energy is distributed to the system 100 by the energy source 215. The energy source 215 may include waste heat, geothermal heat, or other heat sources. For instance, waste heat includes any source of thermal energy that is, for example, 15 degrees Celsius above ambient temperature. Examples of waste heat include combustion engine exhaust, boiler water blowdown, vented low pressure steam, furnace flue gas, or others. Other examples of geothermal heat include hot artesian water, earth steam vents, and the like. Energy sources input into the system 100 may include those which contain recoverable energy from, for example, 50 watts to at least 500 watts of energy or higher. In some aspects, the energy source 215 of the system 100 is selected from a source or process that is otherwise present in the system 100 and the system 100 does not dump waste heat. In other embodiments, the energy source 215 of the system 100 is selected from a process that may dump waste heat outside of the system 100 at one or more module.

Figure 3:
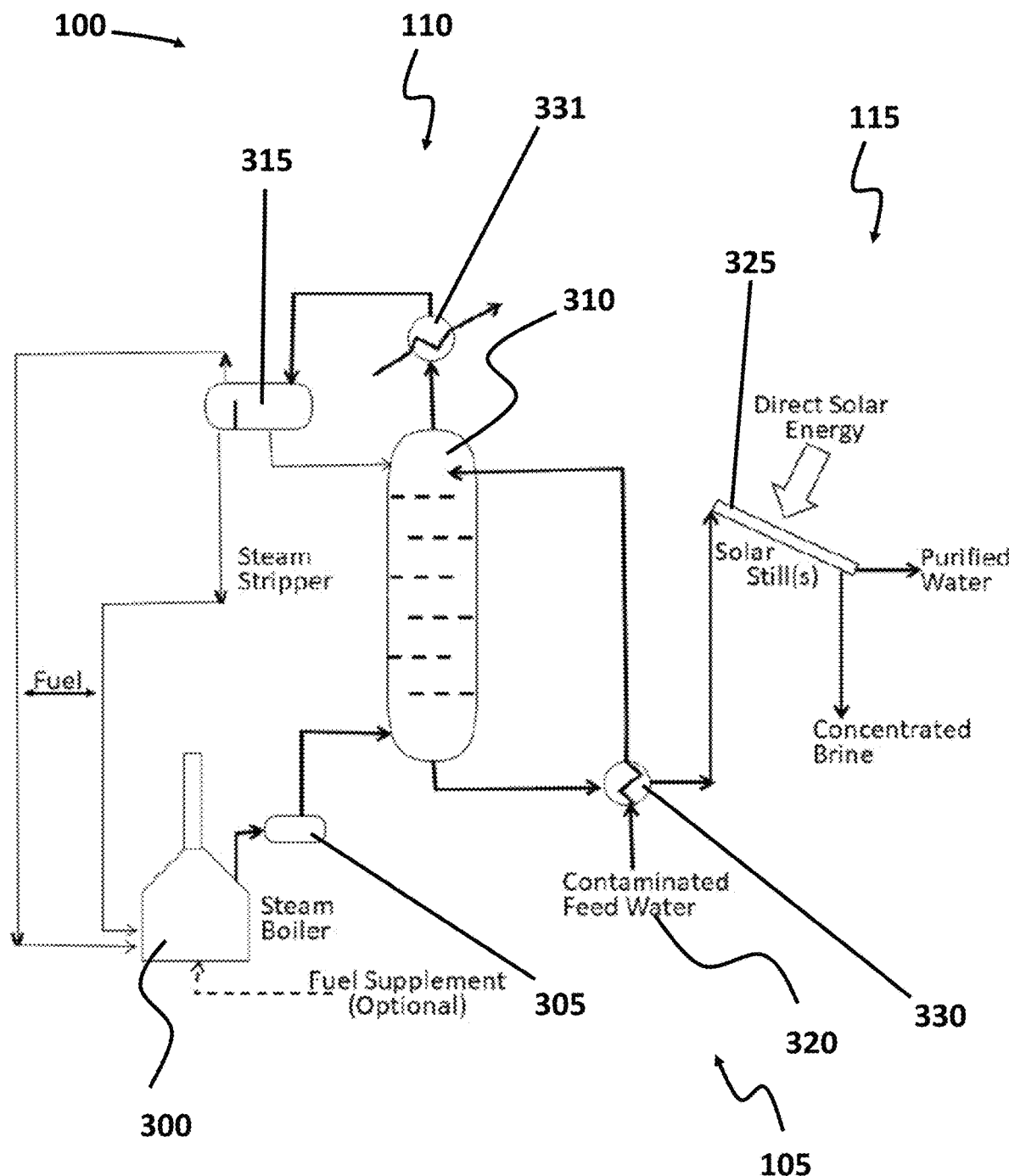
FIG. 3 is a schematic of the system according to one embodiment.

FIG. 3 shows another variation of the system 100. In the example depicted in FIG. 3, the system 100 includes a steam boiler 300. The water source 105 is introduced into the system 100 as a contaminated feed water 320. The water source 105 flows into the steam boiler 300. The steam boiler 300 pressurizes and/or heats the water source 105 to the boiling point of the water source 105, producing steam or other gases. In some embodiments, the system 100 includes a flash tank 305. The system 100 further includes a steam stripper 310. The flash tank 305 is fluidly coupled between the steam boiler 300 and the steam stripper 310. The flash tank 305 is configured to regulate the pressure of the steam. The flash tank 305 is configured to assist in separating the vapor and liquid phases of the mixture, including by rapidly reducing pressure on the heated liquid mixture. The flash tank 305 is connected to the steam boiler 300 such that the gas is able to travel from the steam boiler 300 to the flash tank 305. In certain examples, the steam boiler 300 is directly connected to the steam stripper 310 via the flash tank 305. In some instances, the flash tank 305 includes tubing or staging devices to transport steamed particles through the system 100.

In some embodiments, the steam or gas created by the steam boiler 300 is injected directly into the steam stripper 310 without the need for any further staging that lengthens flow time of the water source 105 through the system 100. However, in other embodiments, the flash tank 305 or other devices connected to the steam boiler 300 control the flow of the water source 105 throughout the system by speeding up or slowing down the velocity of the water source 105 within the system 100. Regulating the flow of the water source 105 through the system 100 prevents the steam stripper 310 from being overwhelmed and allows steam moving through the steam stripper 310 to be able to be treated properly.

In some variations, the steam boiler 300 is placed functionally below the steam stripper 310 so as to allow steam created by the steam boiler 300 to flow upward into the steam stripper 310 due to the relatively lighter density of the steam. Thus, the relatively lower density of the steam produced by the steam boiler 300 can allow the vapors to rise vertically through both the steam boiler 300 and the steam stripper 310 without the need of a pump or additional forces. In many embodiments, the gasses fed into the steam stripper 310 will include other non-water molecules which are to be treated or removed from the water source 105. The steam stripper 310 then treats the gas produced from the steam boiler 300.

As noted previously, in other embodiments, the gas from the steam boiler 300 is moved into the steam stripper 310 via forced directional flow of the water source 105. The gas from the steam boiler 300 is pumped into the steam stripper 310. The steam stripper 310 uses multistage separation devices within or connected to the steam stripper 310, to remove certain compounds such as volatile compounds from contaminated wastewater from processing facilities.

The steam stripper 310 includes a tower structure or other vertical components. The steam stripper 310 acts upon the gas and separates or removes contaminants from the remainder of the water source 105, including by separating volatile compounds. The steam stripper 310 uses differences in pressure/temperature phases between steam and the contaminants in the water source 105. The steam stripper 310 reduces the partial pressure of pollution within the water source 105 by heating and/or creating a positive mass transport from the water molecules of the water source 105 to the gas phase via steam injection. In some examples, the steam stripper 310 uses a supply pump including a heat exchanger, a packed or dish column, a condenser with a separation drum and a reflux device, and/or a decanter. It should be understood that the steam stripper 310 can be constructed with other configurations. It should also be appreciated that in some embodiments, passing the water source 105 through the steam boiler 300 prior to the steam stripper 310 allows the steam stripper 310 to act upon a greater relative concentration of gas as opposed to solid molecules which can interfere with heat exchange within the steam stripper 310.

According to the embodiment shown in FIG. 3, the steam stripper 310 is connected to an accumulator tank 315. The accumulator tank 315 is fluidly coupled to the steam stripper 310 to aid in capture of the liquid water and volatile components condensed at the from steam created by the steam stripper 310. The accumulator tank 315 captures recondensed liquid water, and in some cases, fuel that is subsequently burned by the steam boiler 300. In some instances, the accumulator tank 315 is an overhead drum. The accumulator tank 315 then separates the condensed liquid from the remainder of the solution.

In some variations, the accumulator tank 315 is designed to capture flue gas as an offshoot from the steam stripper 310. At least a portion of the outflow from the steam stripper 310 includes flue gas which is released as exhaust and/or circulated into further devices of the system or recirculated to the steam stripper 310 itself. The flue gas given off from the steam stripper 310 will often include residual substances such as particulate matter, dust, sulfur oxides, nitrogen substances, nitrogen oxides, and carbon containing substances such as carbon monoxide. A portion of condensed liquid from the water source 105 is returned to the steam stripper 310 as reflux.

The relatively hot steam stripper bottom flow is cooled by mixing with the incoming water from the contaminated feed water 320. The cooled water then flows to enhanced evaporator modules, such as a solar still 325. In some embodiments, the solar still 325 is a solar still which includes a translucent roof cover, an internal pool of salt water, and/or a provision for collecting distilled water from the internal surface of the translucent roof. The heated steam stripper bottom flow is cooled by the contaminated feed water 320 being fed into the system 100.

In some aspects, the system 100 separates contents based upon differences in evaporation and condensation points between substances. For example, the system 100 separates molecules based upon evaporation and condensation via the solar still 325 or enhanced surface evaporator designed to remove pure water molecules from salty water. Solar radiation evaporates water which is then collected and recondensed a distillate. The process leaves behind a brine. The solar still 325 is used to enhance the outputs of the system 100 and/or the process of treating the water source 105. In the embodiment depicted in FIG. 3, the outputs are the purified water 225 and/or the brine 230.

The system 100 depicted in FIG. 3, includes devices capable of distributing or manipulating the temperature of water as the water moves through the system. The system 100 includes one or more heat exchanger 330. The heat exchanger 330 can be used to control temperature of water source 105 as the water source 105 flows through the system 100. The heat exchanger 330 controls the mixing of the contaminated feed water 320, the bottom feed from the steam stripper 310, and the top feed into the steam stripper 310. The steam stripper 310 has a liquid inlet and outlet. After the contaminated feed water 320 is introduced into the system, the water source 105 is fed into the liquid inlet of the steam stripper 310 and becomes liquid counterflow against the steam moving through the steam stripper 310. A portion of the steam is recondensed after it passes through the steam stripper 310. The recondensed accumulator tank 315 and is sent back to the steam boiler 300 or is recycled into the steam stripper 310 as recycled feed.

The heat exchanger 330 controls the flow of the water source 105 into the solar still 325. The heat exchanger 330 uses the relatively warmer temperature of the bottom flow from the steam stripper 310 to heat the contaminated feed water 320, which assists in energy efficiency of the system 100. The system 100 utilizes the heat exchanger 330 to create a temperature gradient throughout the system 100 to further provide energy to the system. The temperature gradient is also used to assist in the separation of unwanted substances within the system 100.

The system 100 includes a condenser 331. The condenser 331 constitutes a heat exchange instrumentality for condensing water and other vapors. The condenser 331 assists in converting vapors into liquid forms to be used or separated by the accumulator tank 315. In one case, the condenser 331 condenses other volatile components such as fuel that is burned in the steam boiler 300.

It should be noted that, in some embodiments, careful control of the bottom feed flow rate of the steam stripper 310 is required to avoid potentially hazardous conditions in the desalination module(s). For instance, the rate of removal of undesirable molecules from the water source 105 will often need to outpace the rate of flow of water source 105 into the desalination modules such as the solar still 325. In such embodiments, the water source 105 will need all or a major portion of volatile molecules, flammable material, or undesirable molecules to be removed from the bottom flow of the steam stripper 310 prior to providing feed to the desalination module. The presence of too hazardous molecules in the feed to the solar still 325 may cause unwanted substances to build up or concentrate in the solar still 325. Careful control of the water source 105 will need to be regulated so as to achieve efficiency and efficacy of the system 100 as the water source 105 moves through the system 100. Similarly, if gas or air in the vapor space of the water source 105 reaches the Lower Explosive Limit (LEL), the mixture could become spontaneous for undesirable reactions or could cause a reaction to occur in the desalination modules such as an explosion.

In still other embodiments, the system is capable of determining the contents of the water source 105. In such examples, the system 100 uses a desalination module and/or enhanced surface evaporation modules on salt-containing feed water streams with no use of the steam stripper 310 for feed streams not containing volatile carbon containing compounds.

Figure 4:
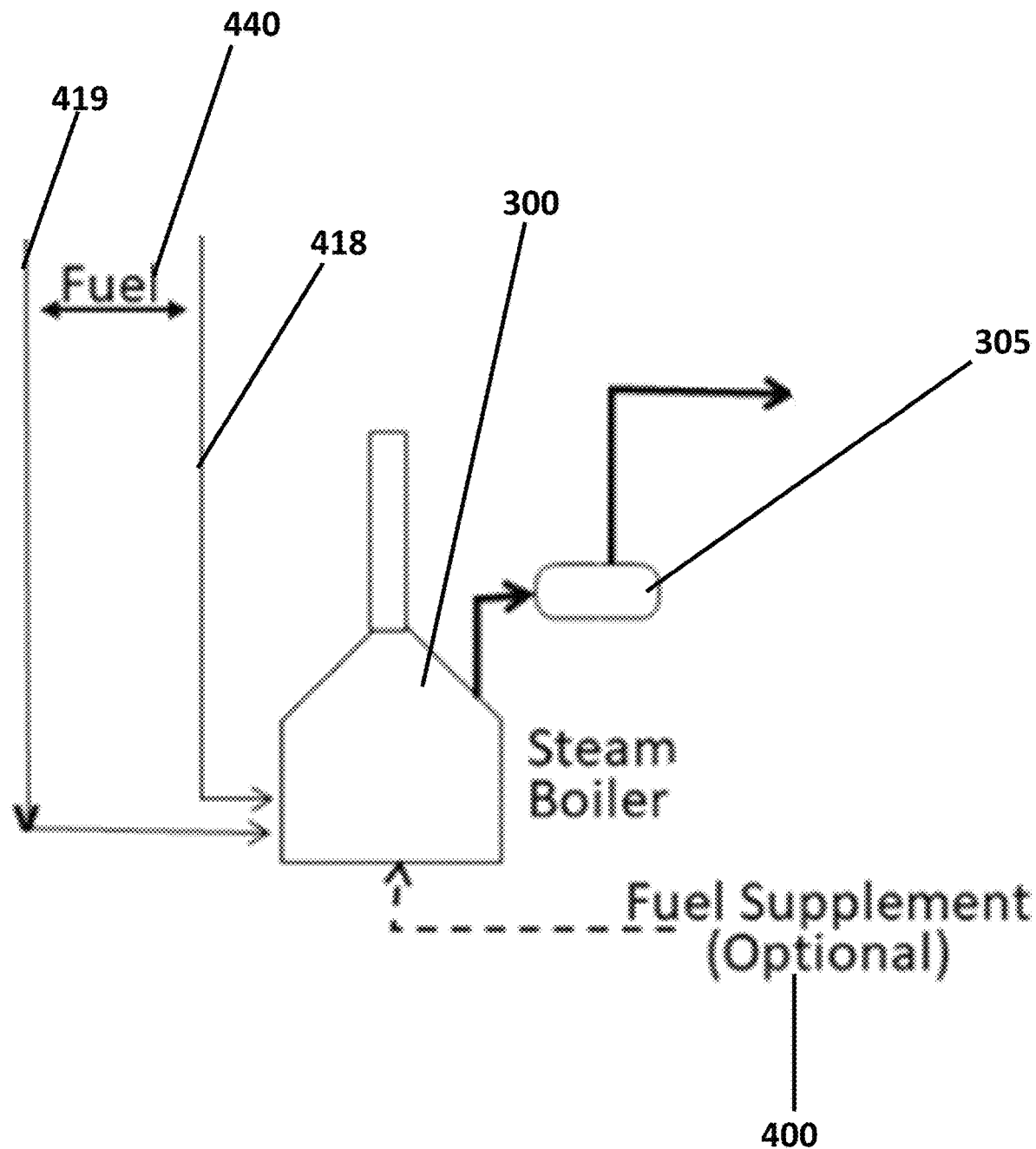
FIG. 4 is an enlarged view of an area around a steam boiler used in the FIG. 3 system.

FIG. 4. is a zoomed-in view of a portion of the system 100 shown in FIG. 3. The steam boiler 300 is fluidly connected to the system 100 via one or more connection points, allowing for multi-directional flow to the steam boiler 300. The steam boiler 300 in one form includes a fuel supplement 400 that provides fuel, such as oil, gas, and/or coal, that is burned to boil the water within the steam boiler 300. The water boiled by the steam boiler 300 can come from a variety of sources such as from the contaminated feed water 320 as well as other water sources. In other examples, the system 100 does not include the fuel supplement 400, but the heat or energy for boiling the water in the steam boiler 300 comes from other sources. For instance, the fuel for the steam boiler 300 can alternatively or additionally come from the stripping process of the contaminated water in the steam stripper 310.

Referring to FIGS. 3 and 4, while the condenser 331 not only condenses steam from the steam stripper 310 into liquid water that is collected in the accumulator tank 315 for reintroduction into the steam stripper 310, the condenser 331 helps in the condensation and collection of other volatile components from the steam stripper 310 that are collected in the accumulator tank 315. In addition to liquid water, the accumulator tank 315 collects volatile fuels both in gas (vapor) and liquid forms. The liquid fuel collected in the accumulator tank 315 is fed to the steam boiler 300 via a liquid fuel feed path 418, and the gas or vapor form of the fuel collected in the accumulator tank 315 is fed to the steam boiler 300 via the fuel vapor feed path 419. In other words, the liquid fuel feed path 418 and fuel vapor feed path 419 supply fuel 440 that is burned in the steam boiler 300. As noted before, the fuel from the fuel supplement 400 in some cases can be burned along side with the fuel 440 from the liquid fuel feed path 418 and fuel vapor feed path 419 in the heat exchanger 330. In other cases, the fuel supplement 400 is not used, and only the fuel 440 from the liquid fuel feed path 418 and the fuel vapor feed path 419 is burned in the boiler. Collecting the fuel 440 from the steam stripper 310 via the condenser 331 and the accumulator tank 315 enhances the overall energy efficiency of the system 100.

Figure 5:
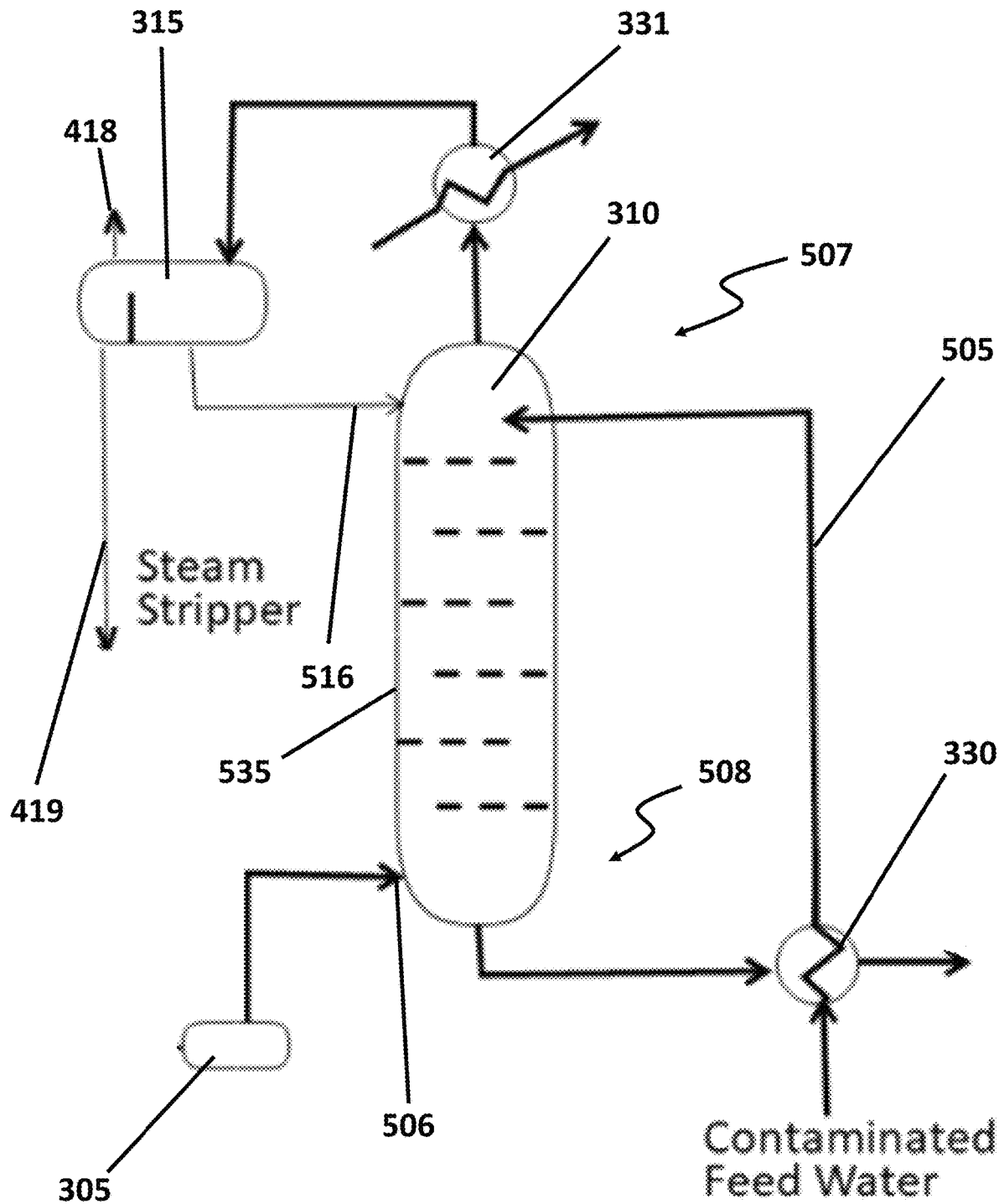
FIG. 5 is an enlarged view of an area around a steam stripper used in the FIG. 3 system.

FIG. 5 shows a zoomed-in view of an aspect of an embodiment of the system 100. The system 100 feeds water into the steam stripper 310 by a steam stripper feed 505. The arrangement shown in FIG. 5 depicts an example embodiment of the flow of the water source 105 through the system 100. Once the water source 105 enters the system, it is fed into the steam stripper 310 as countercurrent. A portion of the water source 105 is circulated into the steam boiler 300. From there, FIG. 5 shows an example pathway to next take place. In certain instances, the water source 105 is first treated by the steam boiler 300 before moving to the flash tank 305. In other instances, the water source 105 is first passed through the steam stripper 310. In certain embodiments, the water source 105 is removed from the steam stripper 310 and passed into a accumulator tank 315. In this particular embodiment, the water source 105 in the accumulator tank 315 is recycled into the top of the steam stripper 310. The water source 105 is also passed into the top of the steam stripper 310 as reflux and is used to control flow and temperature of the water source 105 being treated by the steam stripper 310. The steam is used to heat the water source 105. The steam provides a medium for volatile components within the water source 105 to evaporate. In other examples, the steam carries evaporated components upward through the steam stripper 310.

In certain variations, as the water source 105 is heated by steam within the steam stripper 310 undesirable compounds begin to vaporize into gas. In some embodiments of the steam stripper 310, the steam stripper 310 is equipped with platforms, trays, or packing materials which are used to enhance the separation process by providing increased surface area or increasing contact points between the rising vapor and any liquid or solid components that may be present. In some aspects, as the vapor rises through the steam stripper 310 or columns of the steam stripper 310, the vapor reaches a cooler area within the steam stripper 310 which will then cause the vapors to re-condense back into liquid form. The molecules which are non-condensable or are less condensable such as those which are less volatile will continue to rise through the steam stripper 310 and exit the top of the steam stripper 310 as vapor stream. The steam stripper 310 utilizes the difference in condensability of substances in order to effectuate the desired treatment of the water source 105 as certain molecules are removed from the water source 105. In some aspects, the condensed liquid collected as product stream may undergo further processing, which may involve additional purification steps or devices.

In certain embodiments of the system 100, the water source water source 105 first moves to the steam boiler steam boiler 300 which creates steamed particles that are transported into the steam stripper 310 at an injection site 506. The steam stripper 310 is a generally elongate or vertical structure having a basal end 507 and a distal end 508. In some embodiments, the injection site 506 is located at the base of the steam stripper 310 toward the basal end 507. The steam injected into the base of the steam stripper 310 is relatively less dense than the surrounding air within the system 100 causing the steam to rise through the steam stripper 310 toward the distal end 508 without the need of additional energy input. In other embodiments, the steam is pumped or forced through the steam stripper 310.

In the example shown in FIG. 5, the accumulator tank 315 recondenses the steam product from the steam stripper 310 to separate water from unwanted insoluble organics by using a decanter. The accumulator tank 315 uses the recondensed water as reflux to circulate water and/or uncondensed vapor back into the steam stripper 310 near the distal end 508 through a liquid refeed 516. The system 100 also includes a feed through which the contaminated feed water 320 is supplied into the steam stripper 310 at the distal end 508 of the steam stripper steam stripper 310. The water source water source 105 from the contaminated feed water 320 runs countercurrent to the steam flowing upward through the steam stripper 310. The contaminated feed water 320 is preheated by the bottom flow of the steam stripper 310. The preheated contaminated feed water 320 is then fed to the top of the steam stripper 310.

The steam stripper 310 includes one or more stripper columns 535 which contain catalytic surfaces for treating steam. The stripper column 535 includes packing nodes or trays to increase the surface contact between the steam and water, resulting in greater contaminant removal.

Figure 6:
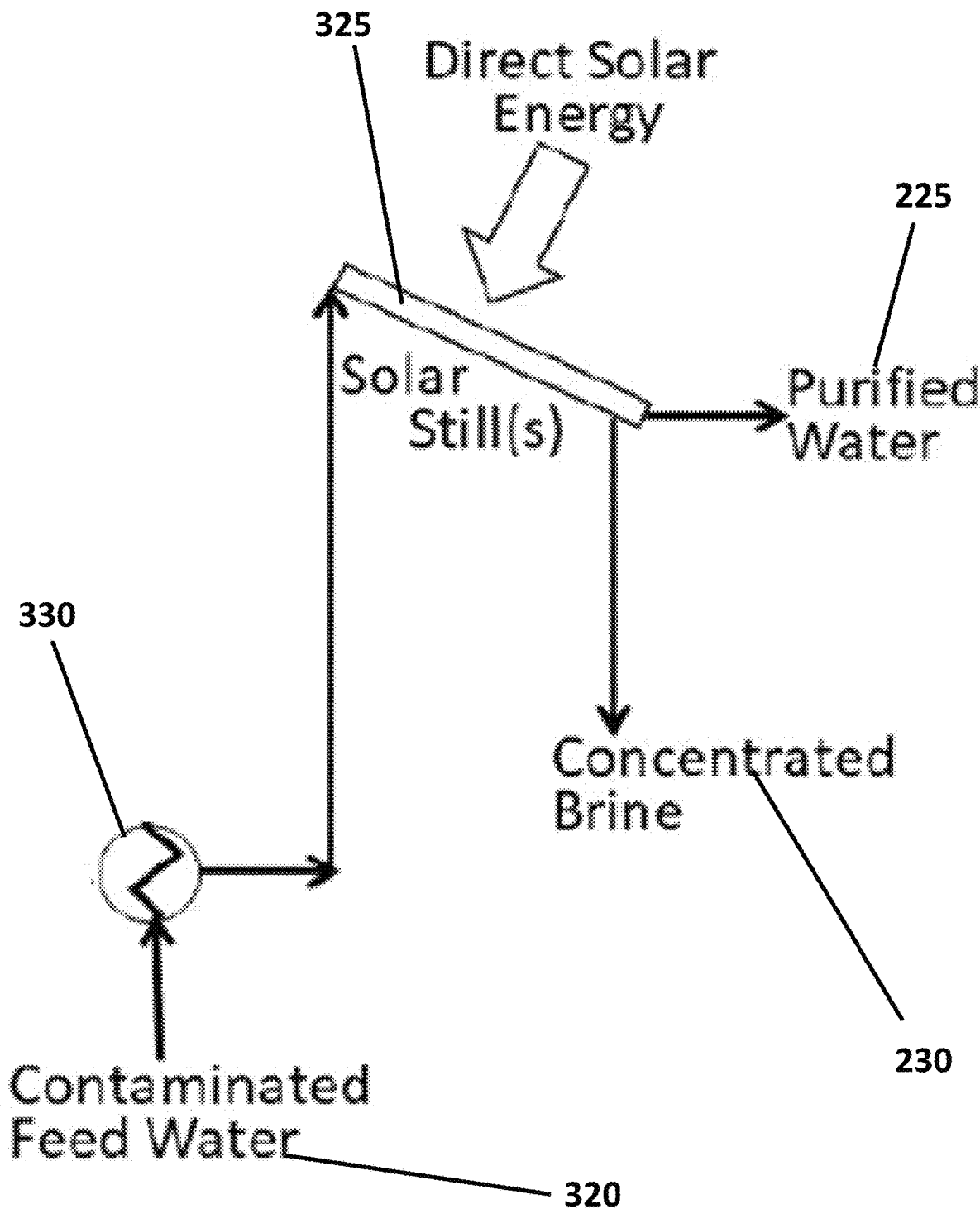
FIG. 6 is an enlarged view of an area around a solar still used in the FIG. 3 system.

FIG. 6 shows a zoomed-in view of a feature of one embodiment of the system 100 from FIG. 3. FIG. 6 further shows an example of the system 100 which may include the solar still 325 and may include an energy source derived from direct solar energy. The energy input from direct solar exposure increases the energy input into the system 100. The energy input from direct solar exposure may ultimately be directed toward the water source 105 in order to heat the water source 105. It should also be appreciated that there is more than one effective configuration of the solar still 325.

In some aspects, the solar still 325 is used to purify the water source 105 or other liquids through the use of a transparent cover which heats up the surface of the water in the solar still 325. The increase of heat energy or enthalpy causes molecules of the water source 105 to be evaporated, leaving behind molecules with a higher boiling point or melting point such as salts, chemicals, and microorganisms. As the water source 105 rises from the basin of the solar still 325, the water source 105 comes into contact with a relatively cooler surface such as the transparent cover of the solar still 325, which causes the evaporated molecules from the water source 105 to re-condense and form droplets. The condensed droplets from the water source 105 are collected or channeled along the cover and are separated into a different container than the remainder of the molecules from the water source 105 in the solar still 325. Certain aspects of the system 100 includes different outputs or end-products. In the embodiment shown in FIG. 6, the outputs include the purified water 225 and the brine 230.

Figure 7:
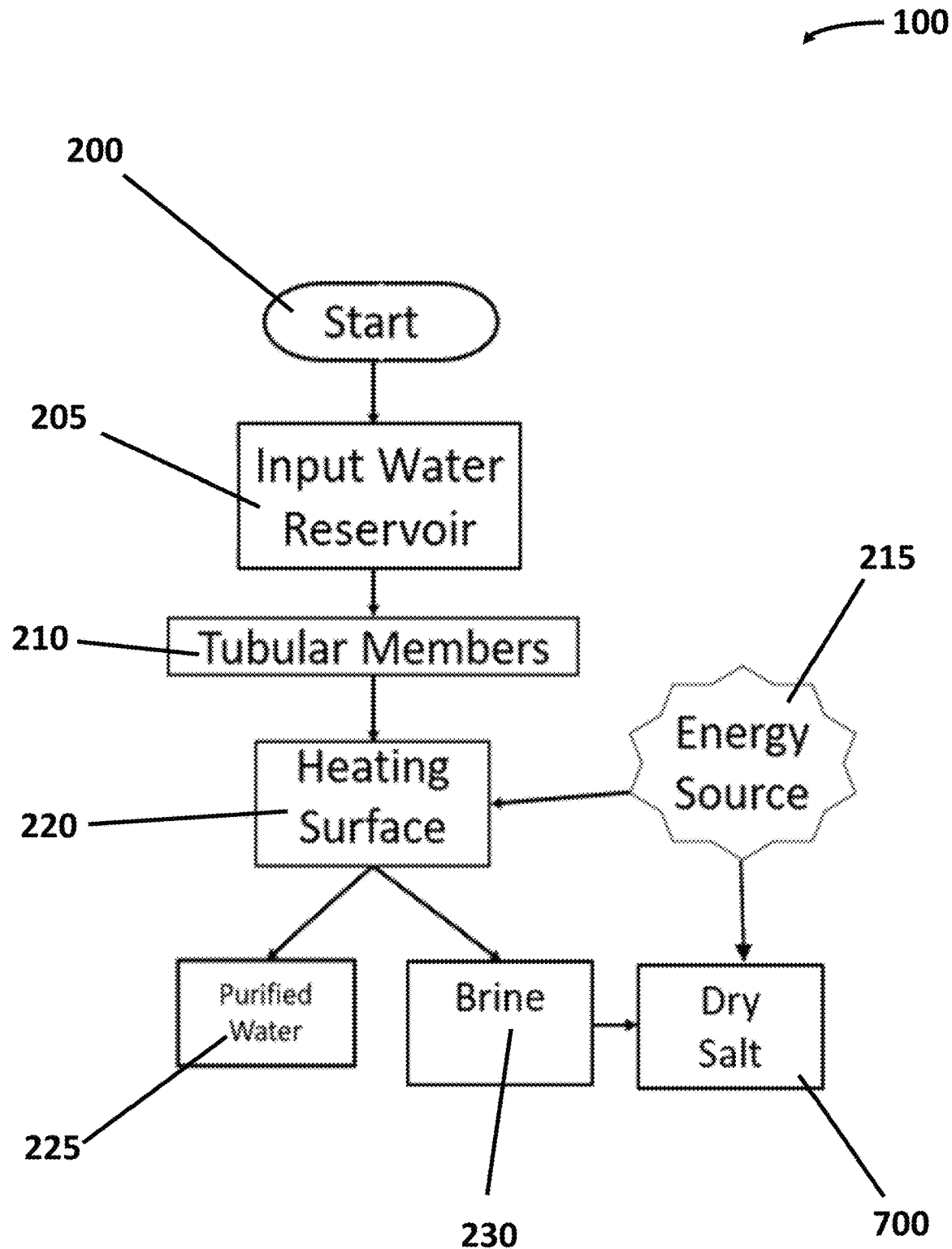
FIG. 7 is a further block diagram of a system according to a further example.

FIG. 7 shows a diagram of another embodiment of the system 100. In the embodiment shown in FIG. 7, the system 100 begins with the initiation feed process 200. In other embodiments, the initiation feed process 200 is not necessary to start the process or to implement certain aspects of the system 100. In the example iteration depicted in FIG. 7, the system 100 uses an input water reservoir 205. The water or other liquid housed within the input water reservoir 205 is not being acted upon by the system 100 prior to the initiation feed process 200. In certain embodiments, the initiation feed process 200 includes causing the input water reservoir 205 to begin flowing into the system 100 including by causing the input water reservoir 205 to begin flowing from an unmanipulated water source into certain devices of the system 100. The input water reservoir 205 flows into the tubular members 210 of the system 100. The tubular members 210 houses the water source 105 from throughout the process and the water source 105 flows through the system 100 as the initiation feed process 200 initiates flow of the water source 105 through the input water reservoir 205 and the tubular members 210. In other embodiments, the system 100 is integrated such that the flow of the input water reservoir 205 is not unidirectional and certain aspects are integrated such that the input water reservoir 205 is circulated throughout the system 100 and re-enters or re-exits certain modules. The system 100 utilizes the energy source 215 in order to provide energy to certain aspects of the volatiles removal module 110 and the desalination module 115 of the system 100. The system 100 includes a heating surface 220. The energy source 215 provides energy to the heating surface 220 to achieve the application of enthalpic energy to the input water reservoir 205. In some aspects, the volatiles removal module 110 and/or the desalination module 115 includes utilizing a heating surface 220 to promulgate treatment or separation of certain substances within the water source 105. In some aspects, the heating surface 220 includes causing evaporation of certain molecules within the input water reservoir 205 of the system 100.

In some instances, the energy source 215 utilizes solar energy. The water source 105 comes from the input water reservoir 205 and the water source 105 is processed in solar desalination modules such as the input water reservoir 205, the tubular members 210, and the heating surface 220, which creates outputs including the purified water 225 and brine 230. In the embodiment shown in FIG. 7, the outputs from the system 100 may include a dry salt 700. In this particular configuration of the system 100, the outputs of the system 100 may also include a purified water 225 and a brine 230 but the brine 230 is further separated or dried to produce the dry salt 700 which has relatively less moisture than the brine 230. In some aspects, the dry salt 700 is removed from the brine 230 as the energy source 215 acts to dry and heat the brine 230, including by adding enthalpy to the brine 230 to remove moisture.

The system 100 is directed toward a desalination module with output products including the purified water 225, the brine 230, and the dry salt 700. In other embodiments, the products of the system 100 are different than the purified water 225 and the brine 230 and include other outputs.

Figure 8:
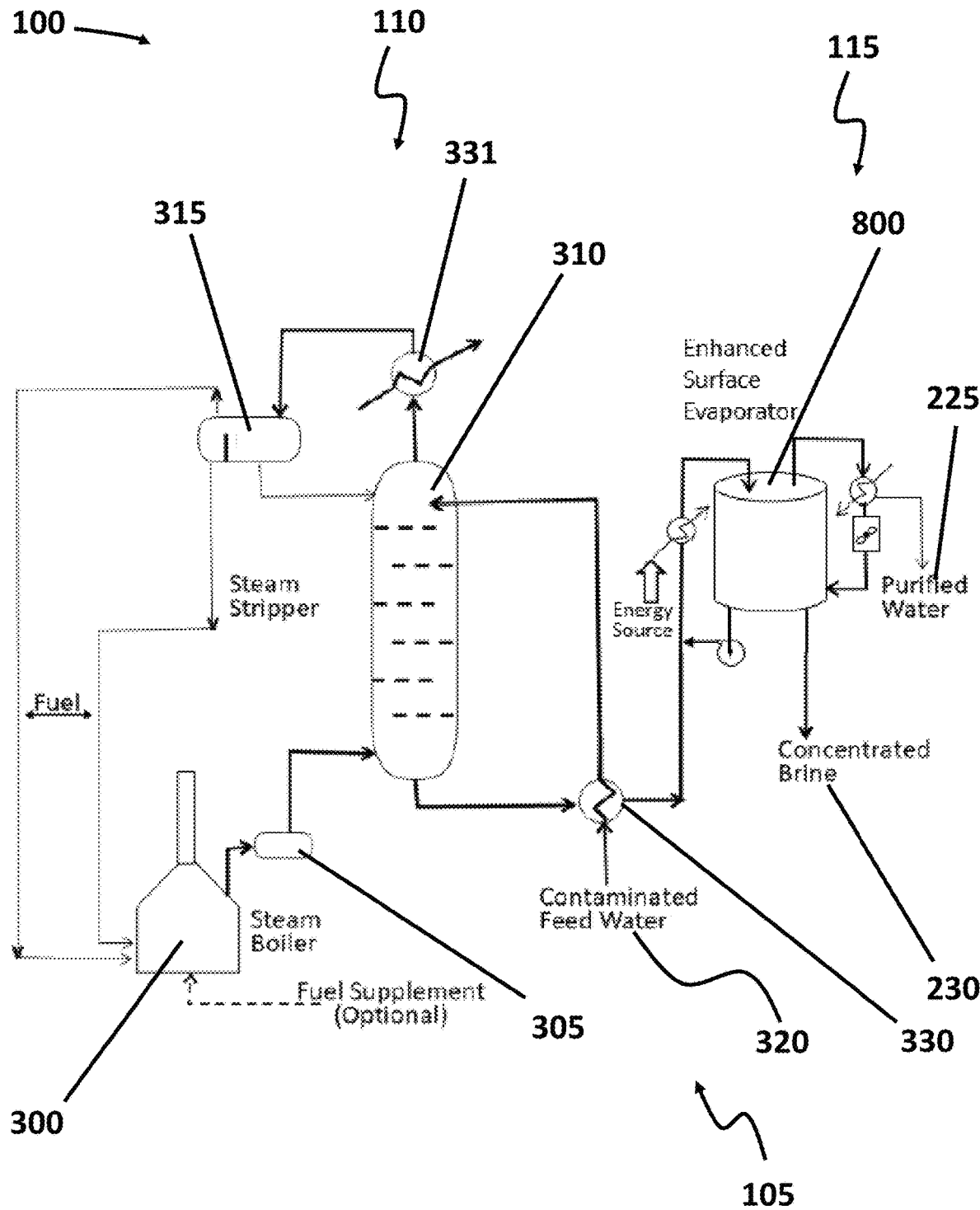
FIG. 8 is a schematic of a water treatment system according to still yet another example.

FIG. 8 shows another embodiment of the system 100, which includes additional or different devices from the system 100 depicted in prior embodiments. In other embodiments, the water from the water source 105 circulates through the devices in a different sequence than previously discussed.

In the embodiment shown in FIG. 8, the water from the water source 105 moves from the steam stripper 310 back to intermix with the contaminated feed water 320 at a specified flow so as not to overwhelm the system 100. The water source 105 may then pass into an enhanced surface evaporator 800 which facilitates evaporation or phase change of molecules within the water source 105. It should be appreciated that different configurations of the enhanced surface evaporator 800 exist and can be utilized in the system 100. In one embodiment, the enhanced surface evaporator 800 uses porous materials or other surfaces to increase the surface area. The liquid of the water source 105 can be directed into the enhanced surface evaporator 800 in a controlled manner so as to manage the efficiency of the system and output. The flow of the water from the water source 105 can be controlled by spraying, dripping, or steady-flow initiation into the enhanced surface evaporator 800 or surfaces within the enhanced surface evaporator 800.

In certain embodiments, heat is applied to the enhanced surface evaporator 800 to provide the energy required for evaporation or phase change of the water source 105. Heat supplied to the enhanced surface evaporator 800 comes from various sources such as hot air, steam, direct heating elements, or other devices within or operatively connected to the system 100. The water that comes into the enhanced surface evaporator 800 begins to evaporate. The evaporation achieved by the enhanced surface evaporator 800 may then be removed through methods such as natural convection, forced airflow, or vacuum systems, or other devices within or operatively connected to the system 100. Vapors evaporated from the water are then collected and/or re-circulated within the system 100.

In some embodiments, the enhanced surface evaporator 800 uses surface media such as wood fiber, cloth fiber, high surface packing material, and similar structures for evaporation of pure water from the contaminated feed water 320, including for embodiments in which the contaminated feed water 320 includes salt, at or below the boiling temperature of the water in the contaminated feed water 320. In other embodiments, the system 100 utilizes a solar desalination system and/or the contaminated feed water 320 to treat the contaminated feed water 320 when the contaminated feed water 320 is contaminated with salt, yet in this particular embodiment the system 100 does not utilize a steam stripper 310 when the contaminated feed water 320 does not contain volatile compounds or carbon compounds.

Figure 9:
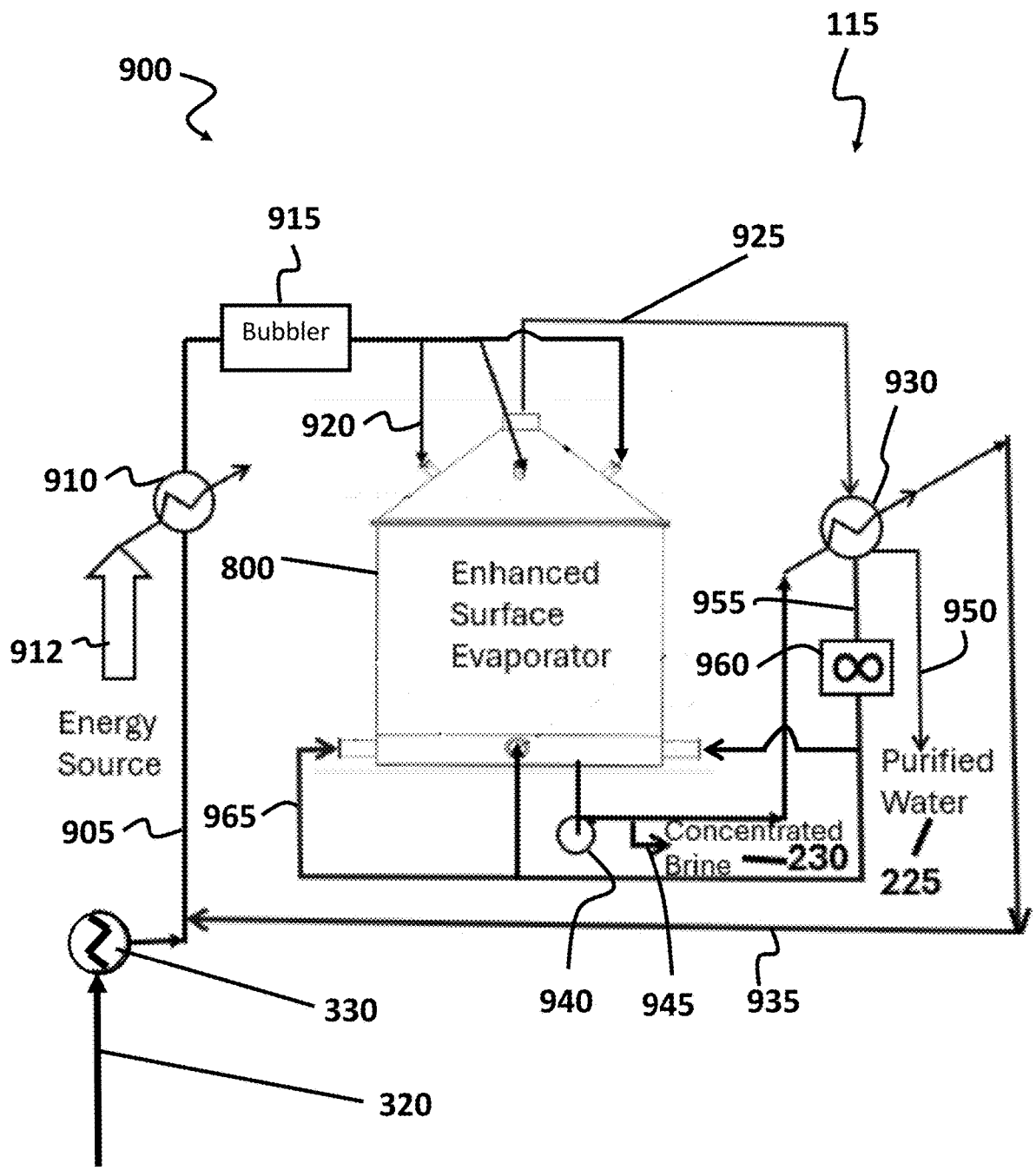
FIG. 9 is an enlarged view of an evaporator subsystem used in the FIG. 8 system.

FIG. 9 shows one exemplary implementation of the desalination module 115 in the system 100 of FIG. 8. As can be seen, the desalination module 115 includes an evaporator subsystem 900 that is configured to purify the water as well as produce concentrated brine. The evaporator subsystem 900 includes an evaporator supply path 905 that receives stripped water from the steam stripper 310 via the heat exchanger 330. Once more, the contaminated feed water 320 is stripped via the steam stripper 310 which is in turn supplied to the evaporator supply path 905 of the evaporator subsystem 900. In other variations, the system 100 does not include the steam stripper 310 such that the water does not go through the stripping process before introduction in the evaporator supply path 905. The water in the evaporator supply path 905 is in liquid form. Along the evaporator supply path 905, the evaporator subsystem 900 has one or more evaporator supply heat exchangers 910 that receive heat or other energy from an energy source 912 in order to heat the water within the evaporator supply path 905. In the illustrated example, the evaporator subsystem 900 has a single evaporator supply heat exchanger 910, but in other examples, the evaporator subsystem 900 can include multiple evaporator supply heat exchangers 910 that receive or exchange heat from multiple, different energy sources 912. For instance, the evaporator subsystem 900 in one version has three evaporator supply heat exchangers 910 that receive heat from multiple different energy sources 912. The energy sources 912 can include heat or other energy sources within the FIG. 8 system 100 and/or external to the FIG. 8 system 100. For example, the energy source 912 can include internal heat sources such as from the steam boiler 300 and/or the steam stripper 310 in the system 100. Some non-limiting examples of the external energy sources 912 can include heat from engine exhaust, boiler water blowdown, vented low pressure steam, furnace flue gas, geothermal heat, and refinery heat, to name just a few examples.

In the illustrated example, the evaporator subsystem 900 has a bubbler 915 disposed along the evaporator supply path 905. The bubbler 915 is configured to introduce or generate bubbles into the liquid water. In a particular example, the bubbler 915 includes a nano-bubbler that is configured to generate nano-sized bubbles. As will be explained in greater detail below, the bubbles in the stripped liquid water facilitate evaporation of the water within the enhanced surface evaporator 800. The evaporator subsystem 900 in other examples does not include the bubbler 915. At the enhanced surface evaporator 800, the evaporator supply path 905 has one or more liquid supply conduits 920 that feed the liquid water to the enhanced surface evaporator 800 for evaporation.

The evaporator subsystem 900 further includes a steam conduit 925 that transports the evaporated water or steam from the enhanced surface evaporator 800. The steam conduit 925 creates a pathway for transporting steam from the enhanced surface evaporator 800 to a condenser 930 of the evaporator subsystem 900. The condenser 930 is used to cool and condense the steam from the enhanced surface evaporator 800 into liquid purified water 225. As shown, the evaporator subsystem 900 further has a brine recirculation path 935 that circulates brine water from the enhanced surface evaporator 800 through the condenser 930 to cool the steam from the steam conduit 925 and condenses the steam into a liquid phase to produce purified water 225. In other words, the brine from the enhanced surface evaporator 800 acts as the coolant for the condenser 930 so as to condense the evaporated water within the steam conduit 925. From the condenser 930, the now heated brine travels along the brine recirculation path 935 and is fed into the evaporator supply path 905 which is then recirculated back through the enhanced surface evaporator 800 via the evaporator supply path 905. Along the brine recirculation path 935, the evaporator subsystem 900 has a pump 940 that pumps the brine from the enhanced surface evaporator 800 through the condenser 930 and into the evaporator supply path 905. In some examples, the evaporator subsystem 900 may not include the pump 940, and instead the evaporator subsystem 900 relies on gravity or other mechanisms for recirculating the brine from the enhanced surface evaporator 800.

As depicted in FIG. 9, the brine recirculation path 935 further has a brine conduit 945 from which the brine 230 is discharged. At the condenser 930, the evaporator subsystem 900 further has a purified water conduit 950 from which the liquid purified water 225 is supplied. At the condenser 930 the humidified air from the steam conduit 925 is somewhat dehumidified and the reduced humidified air is blown through a gas recirculation path 955. In the illustrated example, the gas recirculation path 955 has a fan 960 that blows the dehumidified air to the enhanced surface evaporator 800. In one form, the fan 960 is a booster fan, but in other examples, the evaporator subsystem 900 does not include the fan 960. The air in the gas recirculation path 955 is supplied to the enhanced surface evaporator 800 via one or more gas conduits 965. This air is then blown through the enhanced surface evaporator 800 to promote evaporation of the liquid water from the liquid supply conduits 920.

Figure 10:
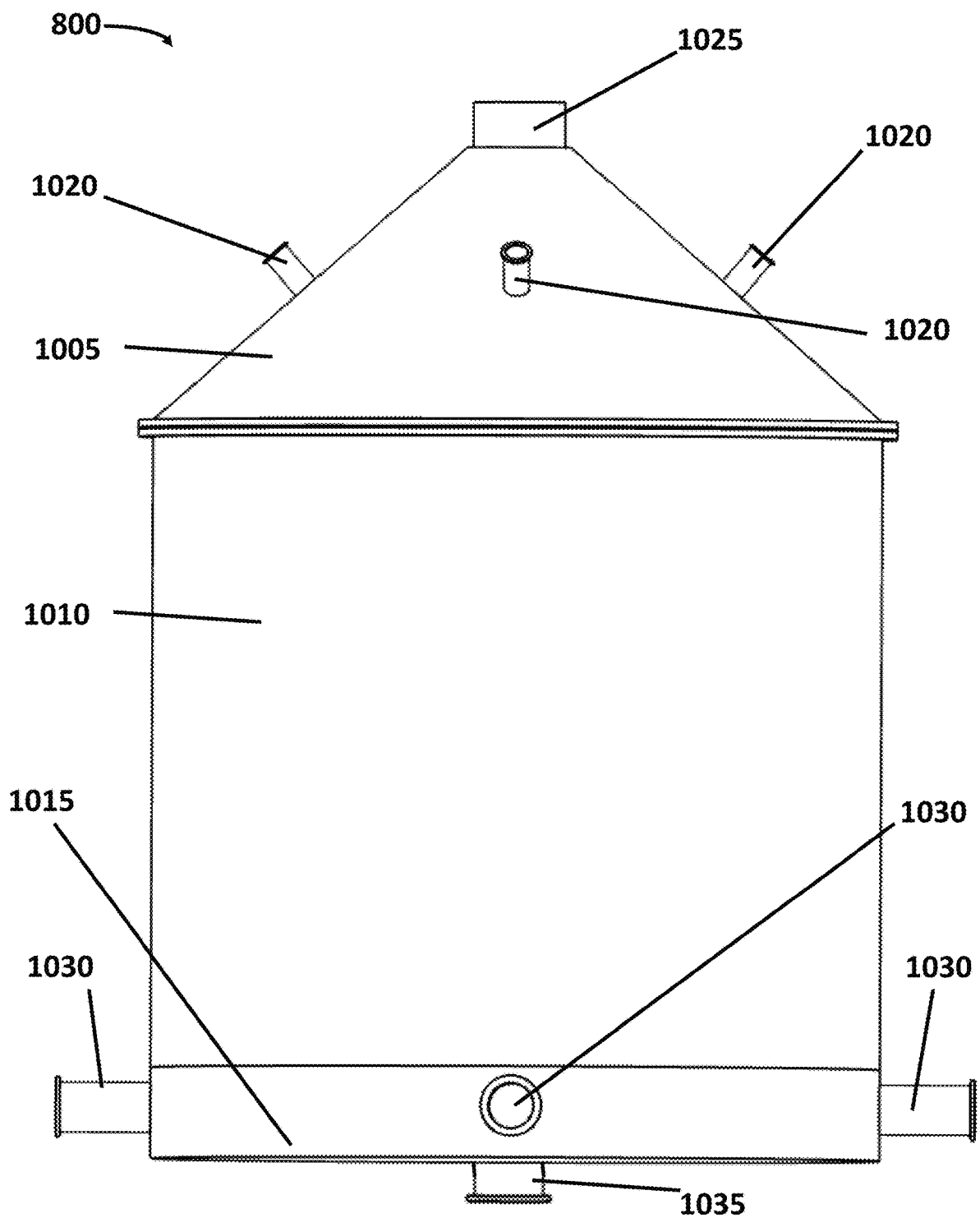
FIG. 10 is a side view of an enhanced surface evaporator used in the FIG. 9 evaporator subsystem.
Figure 11:
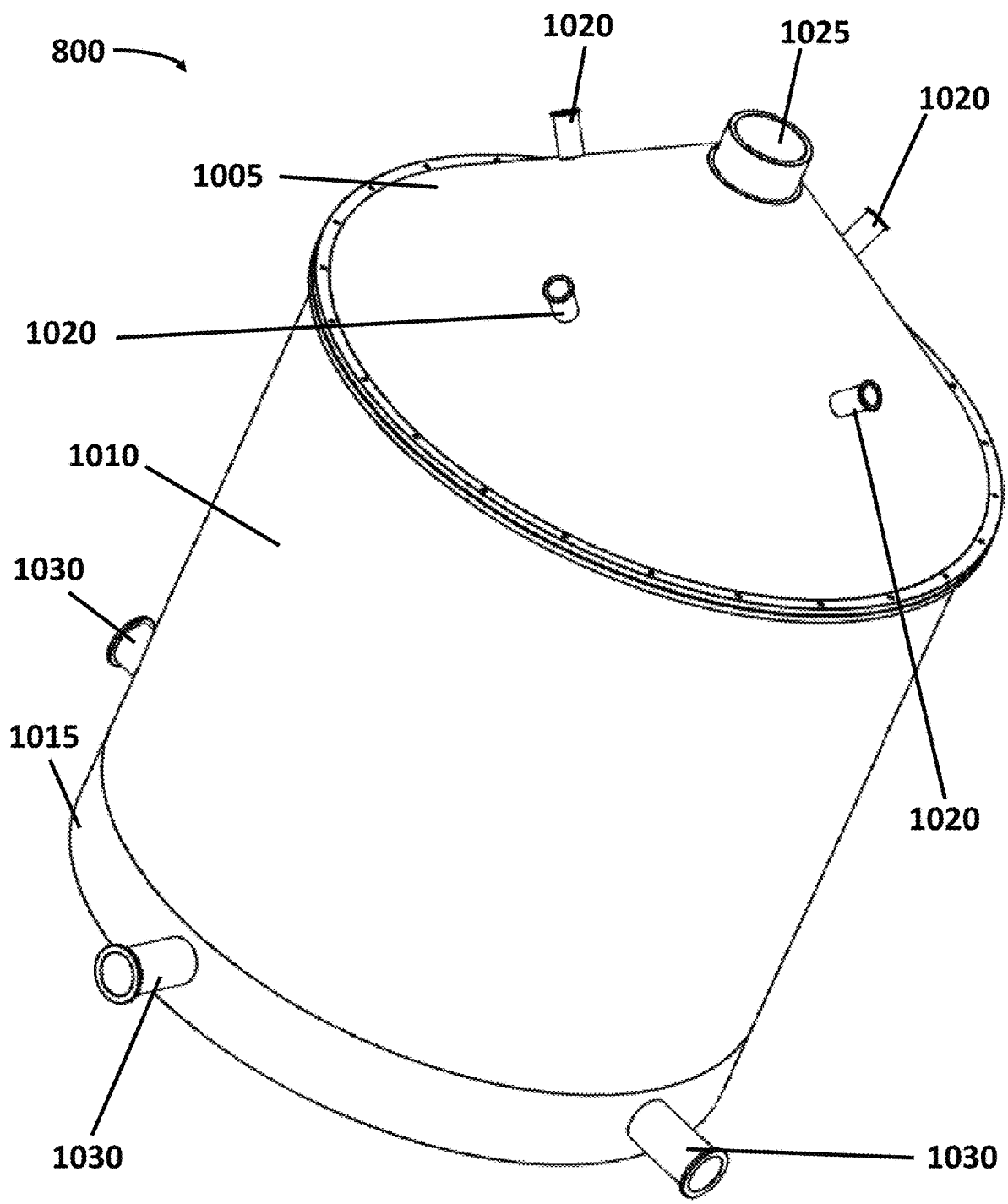
FIG. 11 is a perspective view of the FIG. 10 enhanced surface evaporator.
Figure 12:
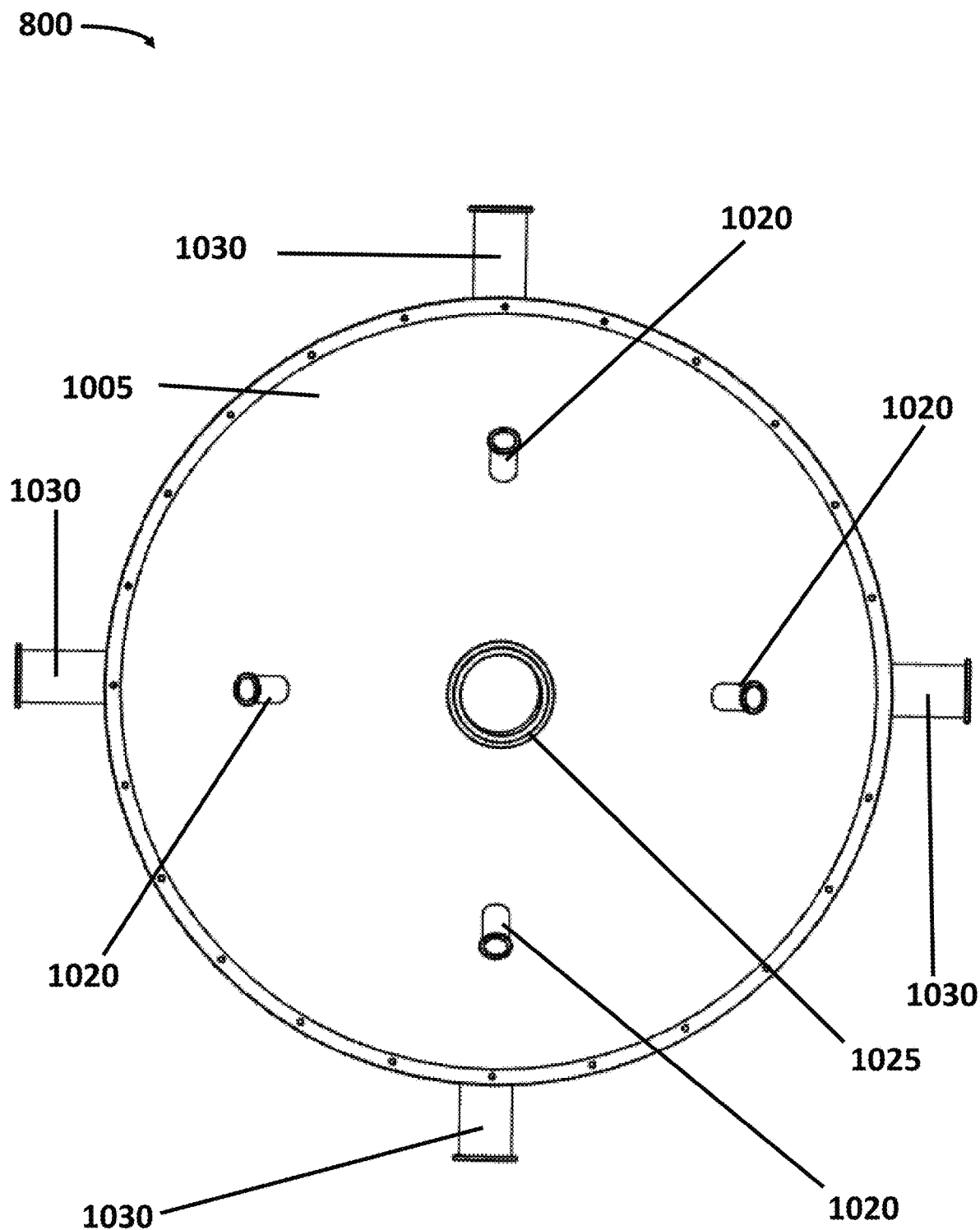
FIG. 12 is a top view of the FIG. 10 enhanced surface evaporator.

Looking at FIGS. 10, 11, and 12, the enhanced surface evaporator 800 includes a roof 1005, a body 1010, and a base 1015. As can be seen, the body 1010 is disposed between the roof 1005 and the base 1015. The roof 1005 in the illustrated example has a frustoconical or funnel shape. As will be explained below, the frustoconical shape of the roof 1005 facilitates recirculation of condensed water within the enhanced surface evaporator 800. The roof 1005 and other examples can be shaped differently. The body 1010 and the base 1015 both generally have a cylindrical shape in the illustrated example, but the body 1010 and the base 1015 can be shaped differently in other examples. In one form, the roof 1005, the body 1010 and the base 1015 are made of the same material, but in other examples, the roof 1005, body 1010, and the base 1015 can be made from different materials. In one example, the enhanced surface evaporator 800 is made from metal, but the enhanced surface evaporator 800 in other examples, including the roof 1005, the body 1010, and the base 1015, can be made of a combination of different or other materials.

As shown, the roof 1005 has one or more liquid inlet ports 1020 that are fluidly coupled to the liquid supply conduits 920 of the evaporator supply path 905. In the illustrated example, the enhanced surface evaporator 800 has four liquid inlet ports 1020 that are disposed at ninety-degrees (90°) relative to one another. The enhanced surface evaporator 800 in other examples can have more or less liquid inlet ports 1020, and the liquid inlet ports 1020 can be arranged at different orientations than is shown. The liquid inlet ports 1020 are configured to introduce the liquid water from the liquid supply conduits 920 into the enhanced surface evaporator 800. At the apex of the roof 1005, the enhanced surface evaporator 800 has an outlet vent 1025 that is configured to vent water vapor from the enhanced surface evaporator 800. The body 1010 is configured to house surface media that is used to promote evaporation of the liquid water from the liquid inlet ports 1020.

The base 1015 has one or more inlet ducts 1030 that are fluidly coupled to the gas conduits 965 of the gas recirculation path 955. The inlet ducts 1030 are configured to receive the dehumidified air from the gas recirculation path 955. The air and/or other gases from the gas conduits 965 is vented through the enhanced surface media to promote evaporation of the liquid water within the enhanced surface evaporator 800 so as to form water vapor that is vented from the outlet vent 1025. In the depicted example, the base 1015 of the enhanced surface evaporator 800 has four inlet ducts 1030 that are disposed at ninety-degrees (90°) relative to one another so as to form a cross pattern. As will be explained below, this cross-pattern shape promotes air circulation so as to enhance evaporation within the enhanced surface evaporator 800. The enhanced surface evaporator 800 in other examples can have more or less inlet ducts 1030, and the inlet ducts 1030 can be arranged differently in other examples.

Not all of the water within the enhanced surface evaporator 800 is typically evaporated. As can be seen, the base 1015 of the enhanced surface evaporator 800 has at least one drain 1035 that is fluidly coupled to the brine recirculation path 935. The drain 1035 via the brine recirculation path 935 and the pump 940 is configured to recirculate the brine through the condenser 930 and to the evaporator supply path 905. In the depicted example, the drain 1035 is positioned at the bottom of the base 1015 to promote drainage of the brine from the enhanced surface evaporator 800, but the drain 1035 can be positioned elsewhere on the enhanced surface evaporator 800 in other examples.

Figure 13:
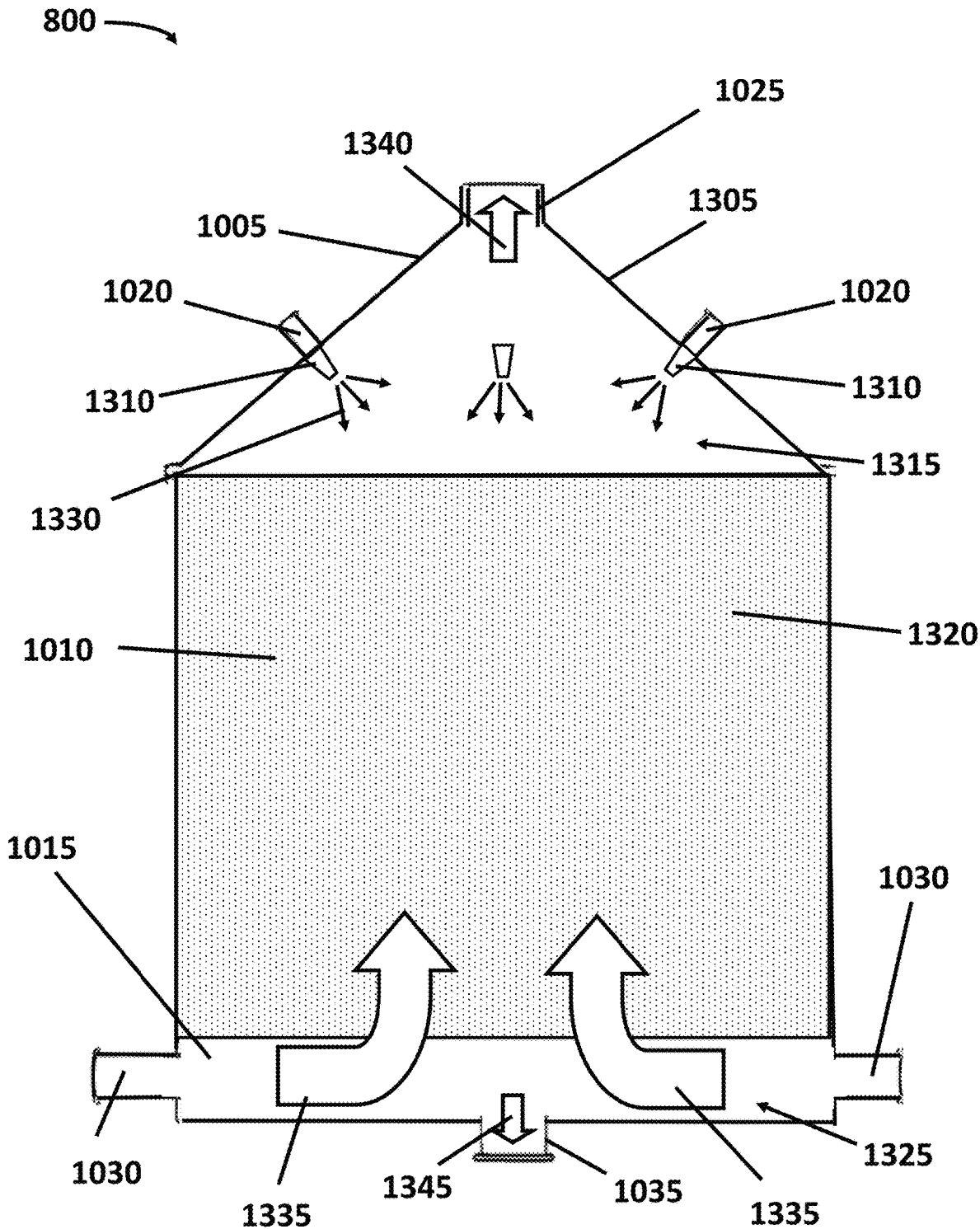
FIG. 13 is a cross-sectional view of the FIG. 10 enhanced surface evaporator.

FIG. 13 shows a cross-sectional view of the enhanced surface evaporator 800 during operation so as to illustrate the various flow paths of the liquid water, air, water vapor, and brine. With the frustoconical shape, the roof 1005 has a roof wall 1305 that is angled transverse to the body 1010 to promote return of any condensed water on the roof wall 1305 back into the body 1010 of the enhanced surface evaporator 800. Extending from the roof wall 1305, the roof 1005 of the enhanced surface evaporator 800 has one or more spray nozzles 1310. The spray nozzles 1310 are fluidly coupled to corresponding liquid inlet ports 1020 so as to spray the liquid water within a spray cavity 1315 that is defined inside the roof 1005. In the depicted example, the enhanced surface evaporator 800 has four spray nozzles 1310 that are disposed at right or ninety degree (90°) angles relative to one another along the roof 1005 so as to correspond to the location of the liquid inlet ports 1020. In other examples, the enhanced surface evaporator 800 can include more than four spray nozzles 1310 or less than four spray nozzles 1310. Moreover, the spray nozzles 1310 can be arranged differently than in the manner as illustrated.

The body 1010 of the enhanced surface evaporator 800 holds or houses a surface media 1320 that promotes evaporation of the liquid water sprayed by the spray nozzles 1310. As the water flows through the surface media 1320 towards the base 1015, the air from the inlet ducts 1030 flows in the opposite direction through the surface media 1320. At least some of the liquid water within the surface media 1320 evaporates to form water vapor that is vented from the enhanced surface evaporator 800 via the outlet vent 1025. In some examples, the surface media 1320 is made from environmentally friendly media, such as wood fiber and/or cloth fiber, but the surface media 1320 can be made of other materials in other examples. The base 1015 defines a base cavity 1325 that provides a space for air from the inlet ducts 1030 to vent through the surface media 1320. Moreover, the base cavity 1325 is further configured to collect the unevaporated liquid brine or water that is discharged via the drain 1035.

As depicted in FIG. 13, the surface media 1320 discharges the liquid water from the evaporator supply path 905 so as to form a liquid spray 1330. The liquid spray 1330 from the spray nozzles 1310 soaks into the surface media 1320. Air from the gas recirculation path 955 via the gas conduits 965 is blown into the base 1015 via the inlet ducts 1030. FIG. 13 shows one or more air flow arrows 1335 that represents the air flow of the air from the inlet ducts 1030 into the surface media 1320. As noted before, the air generally flows in an opposite direction as to the liquid water from the liquid spray 1330 from the spray nozzles 1310. The liquid water within the spray nozzles 1310 due to gravity tends to drip towards the base 1015. The counter flowing air evaporates at least some of the liquid water within the surface media 1320. It should be recognized that the surface media 1320 increases the surface area so as to promote evaporation of the liquid water. The air, which has now been humidified by the water vapor from the surface media 1320, blows towards the outlet vent 1025. As indicated by exhaust arrow 1340 the humidified air is exhausted through the outlet vent 1025 and into the steam conduit 925. As explained before, the condenser 930 condenses at least some of the water vapor to form the purified water 225 which is just charged via the purified water conduit 950. As indicated by drain arrow 1345, the water that is not evaporated is discharged as a brine to the brine recirculation path 935 via the drain 1035.

Figure 14:
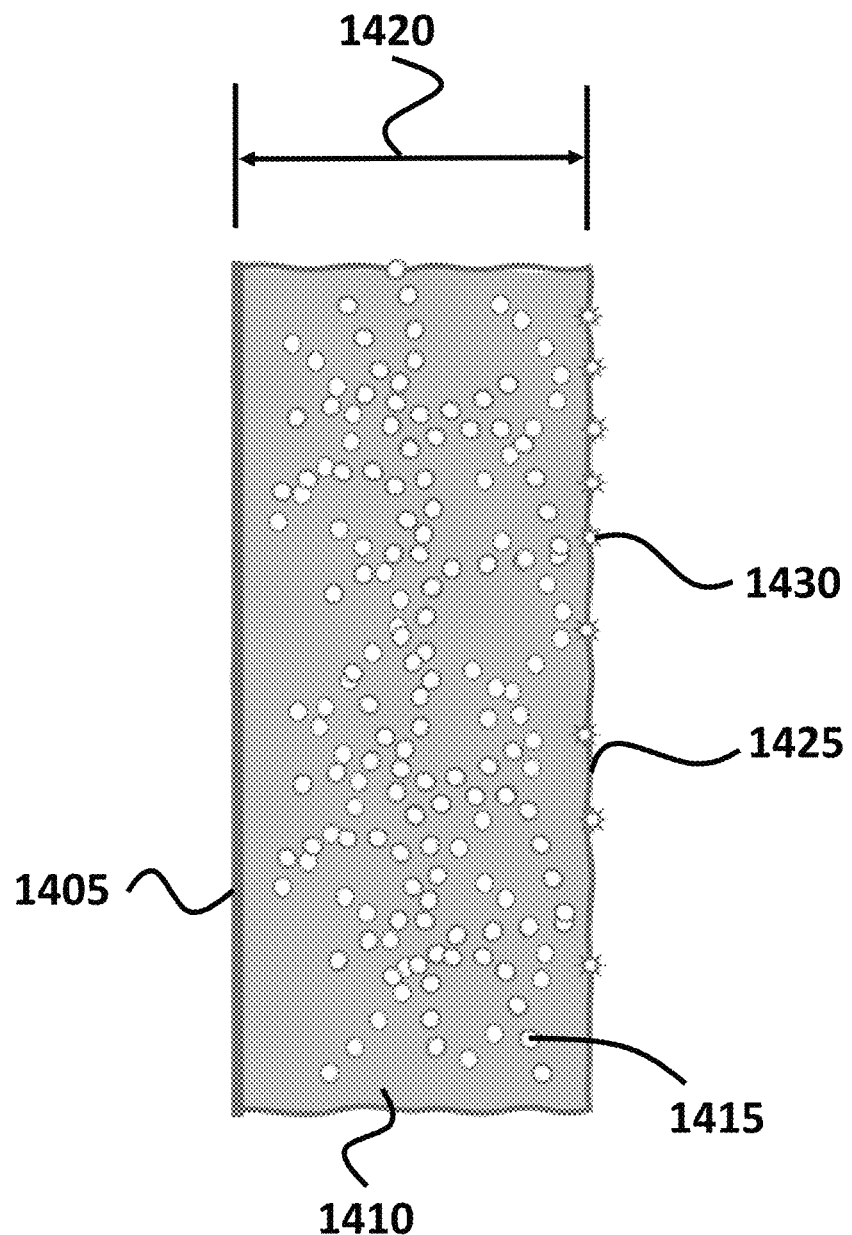
FIG. 14 is an enlarged cross-sectional view of a liquid film with bubbles formed on contact surfaces in the FIG. 10 enhanced surface evaporator.

FIG. 14 shows an enlarged cross-sectional view of a contact surface 1405 on which a liquid film 1410 of the water that was sprayed from the spray nozzles 1310 in the enhanced surface evaporator 800. The contact surface 1405 can include any of the surfaces inside the enhanced surface evaporator 800 such as the various surfaces of the surface media 1320 or the roof wall 1305 of the enhanced surface evaporator 800. For explanation purposes only, the contact surface 1405 will be described as a surface of the surface media 1320, but it should be recognized that the contact surface 1405 can include other surfaces inside the enhanced surface evaporator 800. As discussed above with respect to FIG. 9, the bubbler 915 forms bubbles 1415 within the liquid water in the evaporator supply path 905 that is eventually sprayed by the spray nozzles 1310 inside of the enhanced surface evaporator 800. In most (but not all) cases, the bubbler 915 is a nano-bubbler, and the bubbles 1415 are nano-sized bubbles. The liquid film 1410 on the contact surface 1405 has a relatively small thickness 1420 to promote evaporation. The bubbles 1415 within the liquid film 1410 further promote evaporation. As the bubbles 1415 float to a film surface 1425 of the liquid film 1410, the bubbles 1415 form into surface bubbles 1430 that increase the surface area of the film surface 1425 that is exposed to the air blowing through the surface media 1320. In other words, the effectively increased surface area of the film surface 1425 enhances evaporation of the water liquid film 1410. At the film surface 1425, the surface bubbles 1430 eventually pop, and this popping action further promotes evaporation of the liquid film 1410.

Figure 15:
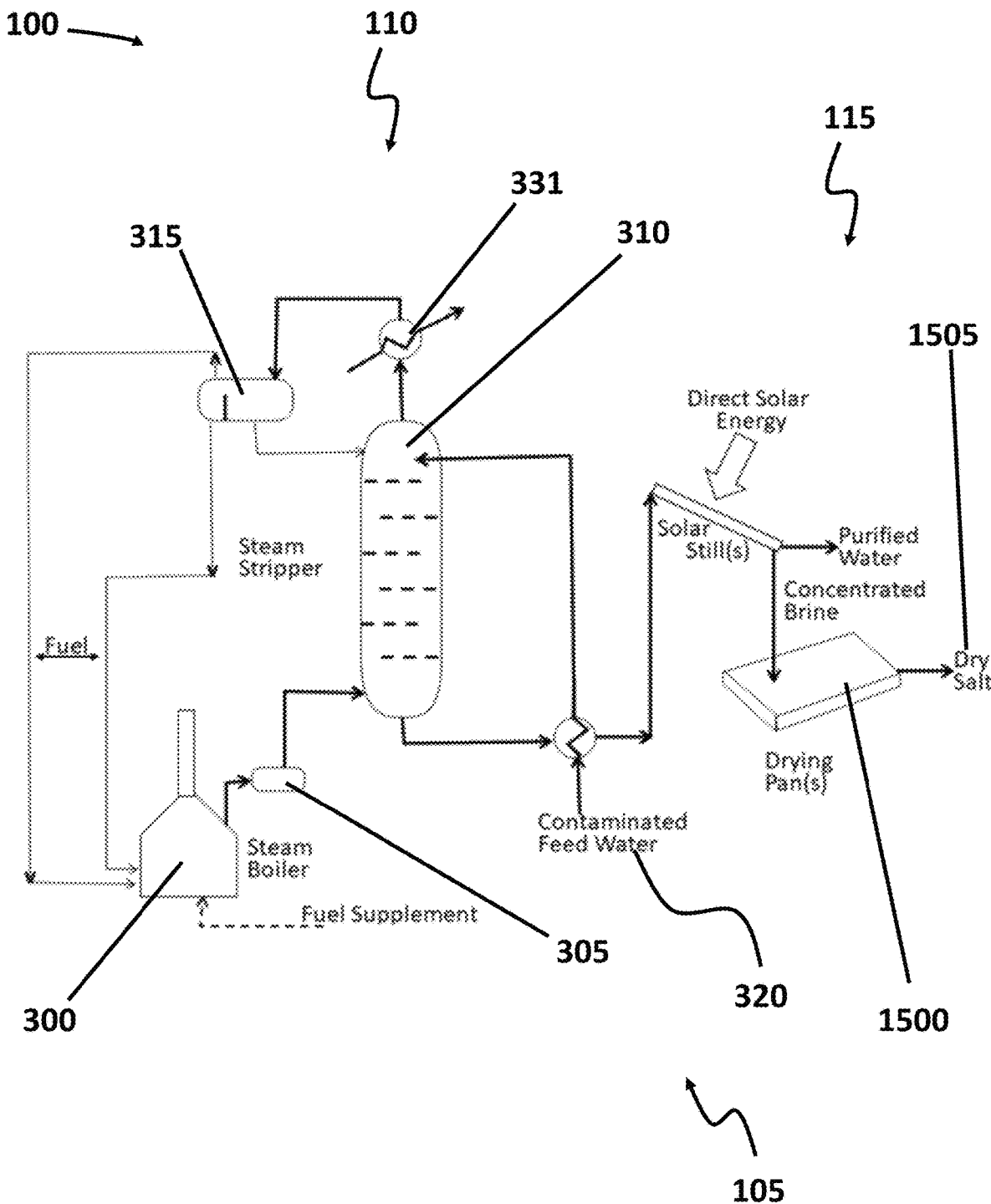
FIG. 15 is a schematic of a system according to another example.

FIG. 15 shows another embodiment of the system 100 and accompanying apparatuses. Many of the devices and sequences depicted in FIG. 15 are congruent with prior embodiments. For instance, the embodiment shown in FIG. 15 includes synonymous configurations of the steam boiler 300, the steam stripper 310, the accumulator tank 315, and the contaminated feed water 320 as depicted in FIGS. 3 and 8.

In FIG. 15, the system 100 includes a drying pan 1500. The inclusion of the drying pan 1500 shown in FIG. 15 allows the output(s) of the system 100 to be fed into the drying pan 1500 to affect the final output. In FIG. 15, the system 100 utilizes the drying pan 1500 in order to produce a dry salt 1505 as an output of the system 100.

Figure 16:
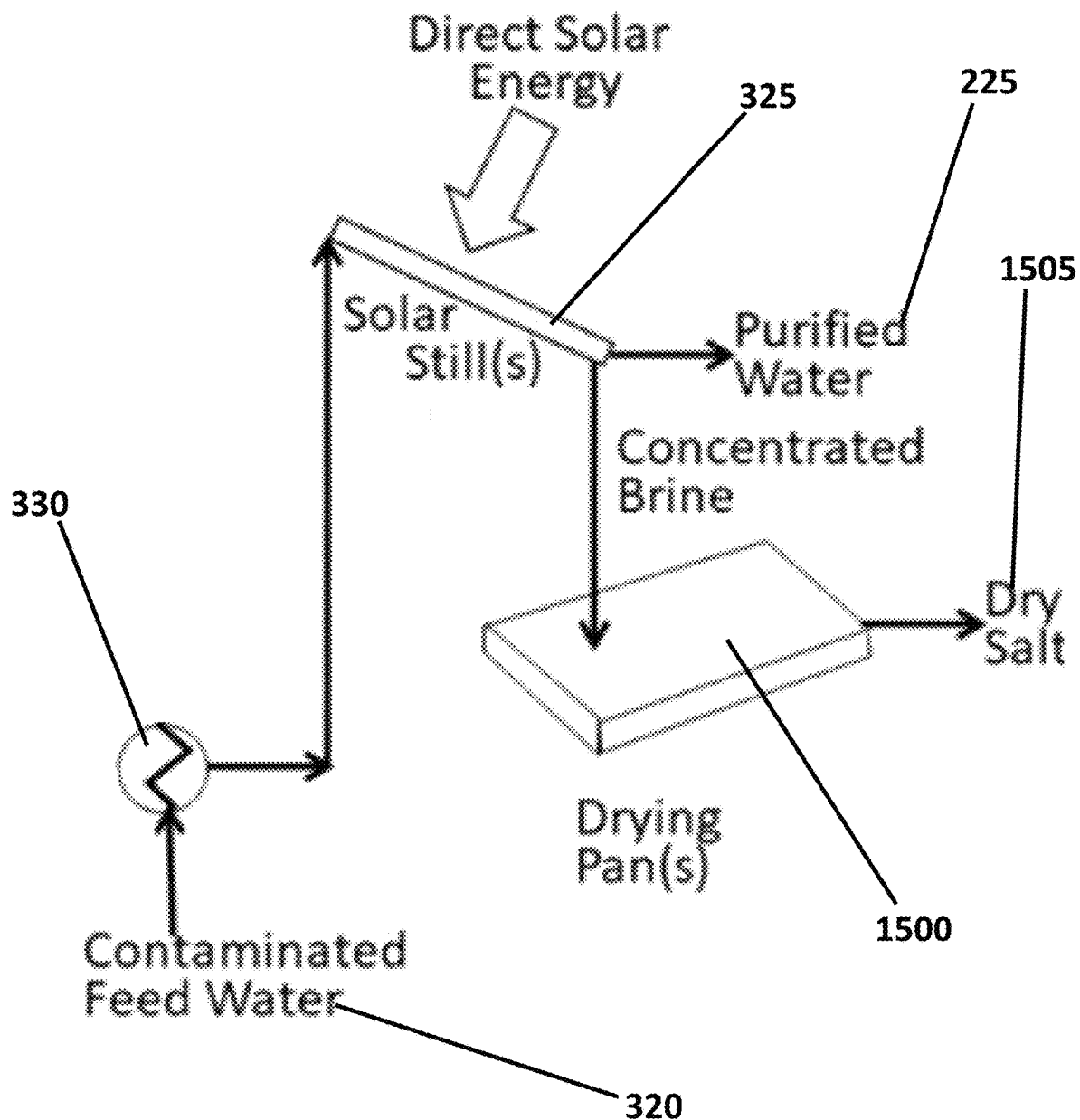
FIG. 16 is an enlarged view of around a solar still used in the FIG. 15 system.

FIG. 16 shows a zoomed in view of aspects of the system 100 shown in FIG. 15. In this view, the system 100 use the drying pan 1500 to allow the end-product of the water source 105 being treated by the system 100 to dry and form a solid end-product.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Boiler", "Steam Boiler", or "Steam Generator" generally refers to a device used to create steam or vapor by applying heat energy to water or another fluid. Generally, the boiler is a closed vessel where a fluid, like water, is heated. The primary function of the boiler is to heat the enclosed fluid. Commonly, the boiler is used to boil the fluid, but this is not necessary in all use cases. In some cases, the boiler might just heat the water without completely boiling the fluid. Some common types of boilers include fire tube boilers, water tube boilers, and supercritical steam generators, to name just a few. In fire tube boilers, hot combustion gases, such as those produced by burning fuel in a firebox, pass through tubes submerged within a sealed container of water. In a water tube boiler, water travels through tubes that are heated by hot gases produced from burning a fuel. Supercritical steam generators operate at supercritical pressures which are above the critical point where the distinction between liquid and gas phases does not exist. Due to the supercritical pressures, boiling does not actually occur in supercritical steam generators.

"Condenser" generally refers to a mechanism used to condensate the steam within the system. The condenser assists in transitioning gasses into liquids. Condensers often operate at a pressure below atmospheric pressure. The condenser removes temperature and/or pressure from vapor in order to reduce the energy contents or levels of the vapors, ultimately reducing at least a portion of the vapor into liquid. The condenser can use cooling water which circulates inside the condenser or from other devices within the system. Different type of condensers include air-cooled condensers, water-cooled condensers, evaporative condensers, direct contact condensers, indirect contact condensers, surfaces condensers, and others known within the industry.

"Conductor" generally refers to a material that allows energy in the form of heat, to transfer within the material, without any movement of the material itself. Put differently, conductors allow efficient transfer of energy in the form of heat. To name just a few examples, conductors can include metals, such as copper, iron, gold, silver, aluminum, titanium, mercury, and/or steel.

"Energy Source" generally refers to a device, structure, mechanism, and/or system that provides power for performing work. The energy supplied by the energy source can take many forms including electrical, chemical, electrochemical, nuclear, hydraulic, pneumatic, gravitational, kinetic, and/or potential energy forms. The energy source for instance can include ambient energy sources, such as solar panels, external energy sources, such as from electrical power transmission networks, and/or portable energy sources, such as batteries. The energy source can include an energy carrier containing energy that can be later converted to other forms, such as into mechanical, heat, electrical, and/or chemical forms. Energy carriers can for instance include springs, electrical batteries, capacitors, pressurized air, dammed water, hydrogen, petroleum, coal, wood, and/or natural gas, to name just a few.

"Enhanced Surface Evaporator" generally refers to a type of evaporator device or system used to transition a liquid into a gas in which at least part of a heat transfer surface or area where the liquid receives heat from a heat source is modified to enhance heat transfer from the heat source to the liquid and/or evaporation. In other words, an enhanced surface evaporator is a type of evaporator that incorporates modifications to the heat transfer surface to enhance heat transfer efficiency and/or evaporation. There are several modifications that can be used to enhance the heat transfer and/or evaporation, and some of these modifications are not mutually exclusive. For example, one modification can include micron-sized fins or ribs that are created on the heating surface to increase the surface area and promote turbulent liquid flow. In another example, a special coating with high thermal conductivity is applied to the heating surface, and in still yet another example, the heating surface includes a structured surface that has microchannels or cavities to enhance liquid flow and create a thin film of liquid to enhance evaporation.

"Fluid" generally refers to a substance that does not have a fixed shape. For example, a fluid includes a liquid and/or a gas. Typically, fluids are able to flow easily, such as air flowing over a wing, blood flowing through a circulatory system, water flowing through plumbing, or oil flowing through a motor as examples. In some cases, a fluid refers to a mixture of solids, liquids, and/or gases. For example, a slurry of solids and water, liquid droplets mixed with air, aerated solid particles, a mixture of solids with liquids and gases, and/or other mixtures of different materials may be fluids.

"Heat Exchanger" generally refers to a device or system that transfers heat between two or more fluids (e.g., liquids or gases). Heat exchangers typically transfer heat between a source fluid and a working fluid. Heat exchangers are commonly used in both cooling and heating applications. In a heat exchanger, the heat generally flows from the hotter fluid to the cooler fluid such by conduction across the walls separating the fluids. Within the heat exchanger, the two fluids flow in close proximity to one another so as to maximize the surface area for efficient heat transfer. Normally, but not always, the two fluids are separated by a solid wall so as to avoid mixing of the fluids and inhibit fluid contamination. The heat exchangers can have a parallel flow arrangement in which the two fluids enter the heat exchanger at the same end and travel parallel to one another to the opposite end. In counter-flow heat exchangers, the two fluids enter the heat exchanger at opposite ends and flow in opposite directions. Some common types of heat exchangers include, but are not limited to, double-pipe heat exchangers, shell-and-tube type heat exchangers, plate heat exchangers, and condenser and boiler type heat exchangers, to name just a few examples.

"Insulator" generally refers to a material and/or structure that has a low thermal conductivity. Put differently, an insulator is a material and/or structure that does not conduct heat well. For example, insulators can be made from glass, porcelain, and/or plastic materials, to name just a few. Insulator structures for example can include air gaps and/or vacuums to minimize thermal conduction.

"Liquid" generally refers to a fluid that has no independent shape but has a definite volume and does not expand indefinitely and that is only slightly compressible.

"Liquid Fuel" generally refers to the output, off-put, or refuse or any extracted material from the system, especially including the steam stripper. The liquid fuel may consist of contaminants or other non-water contaminants. Often, such liquid off-puts will have a high volatility and low boiling point or low specific heat.

"Pump" generally refers to a machine that moves fluids, such as gases, liquids, and/or slurries, by mechanical action. Typically, but not always, the pump is manually powered by a human or automatically powered through energy sources like electrical energy. Commonly, pumps are used to move fluids to different places and/or to increase pressure of the fluid. Some common pump types include centrifugal pumps, positive displacement pumps, axial flow pumps, peristaltic pumps, and gravity pumps.

"Solar Still" generally refers to a device or system that uses heat from the sun to purify a liquid, such as water. In the solar still, a distillation process occurs in which liquid water (or other liquid) containing dissolved substances, such as contaminants or impurities, is heated by the sun to evaporate the water into a vapor or gas, and the resulting water vapor is cooled so as to condense the water back into a purified liquid form. Solar stills provide an environmentally friendly way to produce clean drinking water from saltwater, brackish water, and/or otherwise contaminated water. In one version, the solar still is in the form of a container or housing that includes or is made of a material that is transparent to sunlight, like glass and/or plastic materials, to trap heat from the sunlight inside the container. The heat resulting from the sunlight is used to heat the impure water inside the container. When heated, the water evaporates and leaves behind dissolved salts and other minerals/contaminants in the container. Typically, but not always, the solar still includes a cool, sloped surface upon which the evaporated water vapor condenses. The condensed water drips down the sloped surface into condensation traps for collection purposes. Solar stills can be classified as active type solar stills or passive type solar stills. Passive solar stills rely solely on sunlight for heating the liquid. Active solar stills incorporate additional elements, like reflectors for concentrating sunlight or small pumps to circulate the liquid.

"Steam Stripper" generally refers to a unit or device used to remove volatile contaminants, such as volatile organic compounds (VOCs), or other unwanted compounds from liquids, such as wastewater, using one or more gas or vapor streams. In other words, the steam stripper uses a physical separation process where one or more components of a liquid stream are removed via a vapor stream. In some cases, the liquid stream and the vapor stream can have co-current or countercurrent flows. In most cases, the gas and the liquid move in a vertical direction, but in some steam stripper designs, the gas and/or the liquid may generally flow in a horizontal direction. Steam strippers can come in several different design variations. By way of nonlimiting examples, steam strippers can include tray tower, packed column, spray tower, bubble column, and centrifugal contactor type steam strippers, to name just a few. Tray tower or plate column steam strippers include a vertical column of liquid, such as contaminated liquid water, flowing in a generally vertical direction from the top of the column to the bottom of the column. The vapor, such as water in a gas phase (e.g., steam), flows in the opposite direction. That is, the vapor flows from the bottom of the column to the top of the column. The column includes a series of vertically stacked trays or plates. The trays cause the liquid to flow back and forth in a horizontal direction while the vapor bubbles through the liquid via holes in the trays. The trays are designed to increase the contact area between the liquid and the vapor. In packed column steam stripper designs, the liquid flows from the top to the bottom of the column, and the vapor flows from the bottom to the top of the column. Instead of trays, the packed column uses a packing material to increase the contact area between the liquid and the vapor. In a spray tower design, the liquid is dispersed using one or more sprayers, and the gas or vapor flows through the sprayed liquid. Spray towers for example can include countercurrent-flow spray towers and crosscurrent-flow spray tower designs. In bubble column designs, the gas is bubbled through a column of the liquid. Centrifuges are used to mix the liquid and gas in centrifugal contactor type steam strippers.

"Surface" generally refers to an outermost or uppermost layer of a physical object or space. The surface is typically a portion or region of the object that can first be perceived by an observer using the senses of sight and touch. The surface is usually the portion with which other materials first interact.

"Water Source" generally refers to the any fluid to be treated by the system or treated by devices within the system. It should be understood that "Water Source" includes all phases of water, including solid, liquid, and gas. It should also be understood that the term "Water Source" may refer to sources of water which contain molecules or compounds other than H2O. As discussed in other areas, it should be understood that the system and devices can be used to treat any number of fluids, including those which are not primarily made of water. Thus, "Water Source" includes fluids to be treated which may not necessarily be water.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
105 water source
110 volatiles removal module
115 desalination module
200 initiation feed process
205 input water reservoir
210 tubular members
215 energy source
220 heating surface
225 purified water
230 brine
300 steam boiler
305 flash tank
310 steam stripper
315 accumulator tank
320 contaminated feed water
325 solar still
330 heat exchanger
331 condenser
400 fuel supplement
418 liquid fuel feed path
419 fuel vapor feed path
440 fuel
505 steam stripper feed
506 injection site
507 basal end
508 distal end
516 liquid refeed
535 stripper column
700 dry salt
800 enhanced surface evaporator
900 evaporator subsystem
905 evaporator supply path
910 evaporator supply heat exchanger
912 energy source
915 bubbler
920 liquid supply conduits
925 steam conduit
930 condenser
935 brine recirculation path
940 pump
945 brine conduit
950 purified water conduit
955 gas recirculation path
960 fan
965 gas conduits
1005 roof
1010 body
1015 base
1020 liquid inlet ports
1025 outlet vent
1030 inlet ducts
1035 drain
1305 roof wall
1310 spray nozzles
1315 spray cavity
1320 surface media
1325 base cavity
1330 liquid spray
1335 air flow arrows
1340 exhaust arrow
1345 drain arrow
1405 contact surface
1410 liquid film
1415 bubbles
1420 thickness
1425 film surface
1430 surface bubbles
1500 drying pan
1505 dry salt

What is claimed is:

1. A system, comprising:
a contaminated water feed source configured to supply contaminated feed water containing contaminants;
a desalination module configured to remove at least some of the contaminants from the contaminated feed water;
wherein the desalination module is configured to produce purified water from the contaminated feed water;
wherein the desalination module is configured to produce brine from the contaminated feed water;
an energy source is configured to promote evaporation at the desalination module,
wherein the desalination module includes an enhanced surface evaporator;
wherein the enhanced surface evaporator has surface media configured to promote evaporation;
wherein the surface media is configured to enhance surface evaporation at or below the boiling point of the contaminated feed water;
wherein the energy source is configured to promote evaporation at the enhanced surface evaporator, wherein the surface media includes cloth fiber;
an evaporator supply path configured to transport the contaminated feed water from the contaminated water feed source to the enhanced surface evaporator;
a nano-bubbler disposed along the evaporator supply path;
wherein the nano-bubbler is configured to create nano-sized bubbles in the contaminated feed water; and
wherein the nano-sized bubbles form surface bubbles in a film of the contaminated feed water on the surface media to increase surface area and pop to promote evaporation.

2. The system of claim 1, wherein the energy source is configured to heat the contaminated feed water to at least 15 degrees Celsius above ambient temperature.

3. The system of claim 1, wherein the energy source is configured to provide at least 50 watts.

4. The system of claim 1, wherein the energy source is configured to provide at least 500 watts.

5. The system of claim 1, wherein the energy source includes an external energy source.

6. The system of claim 5, wherein the external energy source includes waste heat from one or more thermal devices.

7. The system of claim 1, wherein:
the energy source includes an internal energy source; and
the internal energy source includes heat from a volatiles removal module.

8. The system of claim 7, wherein:
the volatiles removal module includes a steam stripper;
the volatiles removal module includes a steam boiler; and
the energy source includes heat from the steam boiler.

9. The system of claim 1, further comprising:
wherein the desalination module includes a solar still;
wherein the solar still is configured to produce brine;
one or more drying pans configured to receive the brine from the solar still;
wherein the drying pans are configured to produce dry salt from the brine; and
wherein the energy source is configured to promote drying of the salt in the drying pans.

10. The system of claim 1, further comprising:
an evaporator supply heat exchanger disposed along the evaporator supply path;
wherein the evaporator supply heat exchanger is configured to heat the contaminated feed water with heat from the energy source;
wherein the enhanced surface evaporator has a roof, a base, and a body disposed between the roof and the base;
wherein the enhanced surface evaporator has one or more spray nozzles;
wherein the spray nozzles are fluidly coupled to the evaporator supply path;
wherein the spray nozzles are mounted to the roof of the enhanced surface evaporator;
wherein the roof has an outlet vent;
wherein the body of the enhanced surface evaporator contains surface media configured to promote evaporation;
wherein the spray nozzles are configured to spray the contaminated feed water onto the surface media;
wherein the surface media is configured to promote evaporation of water from the contaminated feed water to create evaporated water;
wherein the surface media is configured to direct the contaminated feed water that is unevaporated to drain towards the base to form the brine;
wherein the base of the enhanced surface evaporator has a drain;
wherein the base of the enhanced surface evaporator has one or more inlet ducts;
a steam conduit fluidly coupled to the outlet vent of the enhanced surface evaporator;
a brine recirculation path fluidly coupled to the drain of the enhanced surface evaporator;
a condenser fluidly coupled to the steam conduit and the brine recirculation path;
wherein the steam conduit is configured to supply the evaporated water from the outlet vent of the enhanced surface evaporator to the condenser;
wherein the brine recirculation path is configured to supply the brine from the drain at the base of the enhanced surface evaporator to the condenser;
wherein the brine in the condenser is configured to cool the evaporated water to produce the purified water in a liquid state and dehumidified air in a gaseous state;
a purified water conduit fluidly coupled to the condenser to supply the purified water from the condenser;
a gas recirculation path connecting the condenser to the inlet ducts to supply the dehumidified air to the base of the enhanced surface evaporator; and
wherein the enhanced surface evaporator is configured to direct the dehumidified air to blow in an opposite direction to the contaminated feed water flowing through the surface media to enhance evaporation.

11. The system of claim 10, further comprising:
a pump disposed along the brine recirculation path to pump the brine from the enhanced surface evaporator through the condenser and into the evaporator supply path; and
a fan disposed along the gas recirculation path to blow the dehumidified air from the condenser to the enhanced surface evaporator.

12. The system of claim 11, wherein:
the roof has a frustoconical shape; and
the inlet ducts include four inlet ducts arranged in a cross pattern to promote circulation.

* * * * *